(12) United States Patent
Imanishi

(10) Patent No.: US 8,751,566 B2
(45) Date of Patent: Jun. 10, 2014

(54) DATA PROCESSING SYSTEM FOR REVERSE REPRODUCTION IN DATA STREAM PROCESSING

(75) Inventor: Junichi Imanishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 13/322,074

(22) PCT Filed: Mar. 3, 2010

(86) PCT No.: PCT/JP2010/001467
§ 371 (c)(1),
(2), (4) Date: Feb. 17, 2012

(87) PCT Pub. No.: WO2010/134242
PCT Pub. Date: Nov. 25, 2010

(65) Prior Publication Data
US 2012/0136914 A1    May 31, 2012

(30) Foreign Application Priority Data

May 22, 2009  (JP) ................................. 2009-124611

(51) Int. Cl.
*G06F 15/16* (2006.01)
(52) U.S. Cl.
USPC ............................ 709/203; 709/201; 709/226
(58) Field of Classification Search
USPC .................. 709/201, 202, 203, 204, 205, 206
See application file for complete search history.

(56) References Cited

U.S. PATENT DOCUMENTS

| | | | |
|---|---|---|---|
| 8,149,748 B2* | 4/2012 | Bata et al. ..................... | 370/311 |
| 2008/0183737 A1* | 7/2008 | Bhalotia et al. ............... | 707/101 |
| 2009/0041053 A1* | 2/2009 | Birmiwal et al. ............. | 370/468 |
| 2009/0112826 A1* | 4/2009 | Fontanot .......................... | 707/3 |
| 2010/0217887 A1* | 8/2010 | Bouazizi et al. .............. | 709/231 |
| 2011/0213203 A1* | 9/2011 | Minai et al. ................... | 600/109 |
| 2011/0231499 A1* | 9/2011 | Stovicek et al. .............. | 709/206 |

OTHER PUBLICATIONS

Babcock, Brian, et al.; Models and Issues in Data Stream Systems; pp. 1-30; DB Magazine, May 2009.
PCT International Search Report on application No. PCT/JP2010/001467 dated Apr. 6, 2010; 2 pages.

* cited by examiner

*Primary Examiner* — Dhairya A Patel
(74) *Attorney, Agent, or Firm* — Foley & Lardner LLP

(57) ABSTRACT

The present invention is for shortening the time required to discover a phenomenon related to a detected event. Reverse reproduction is performed in data stream processing. Specifically, a computer system 3 processes multiple pieces of input data 141 in accordance with times in chronological order denoted by the timestamps 142 within the input data 141, beginning from input data 141 including a timestamp (hereinafter, latest reference stamp) that denotes the newest time from among the timestamps denoting times prior to a reference time (for example, an event detection time). A method for creating output data 171 including the result of this processing and output timing are controlled on the basis of the lifetime of the input data 141, which is specified by a query 131. In accordance with this, the output data is properly outputted using reverse reproduction.

4 Claims, 22 Drawing Sheets

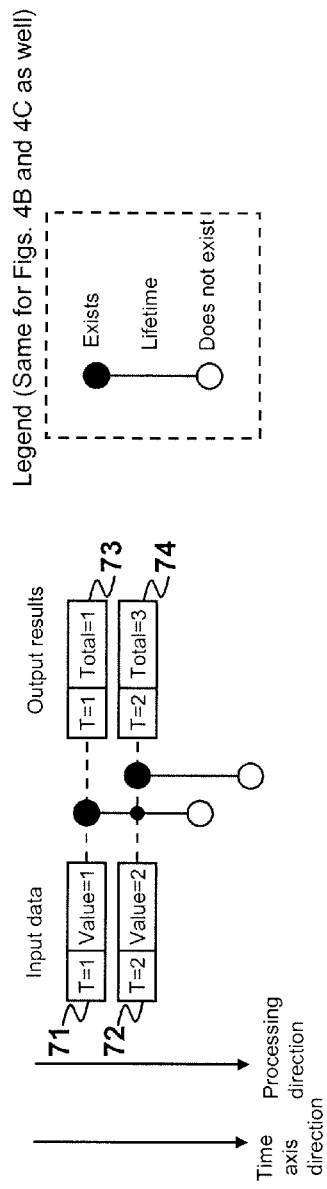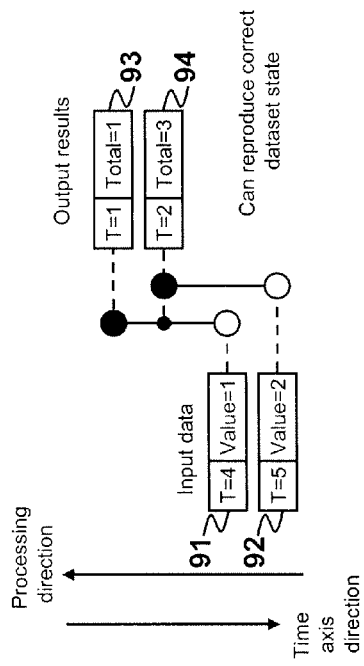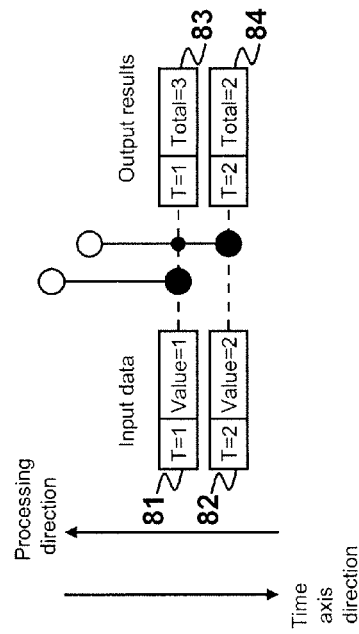

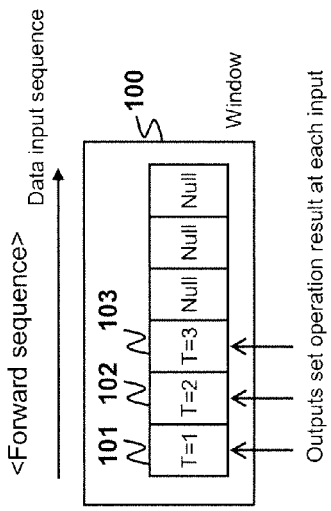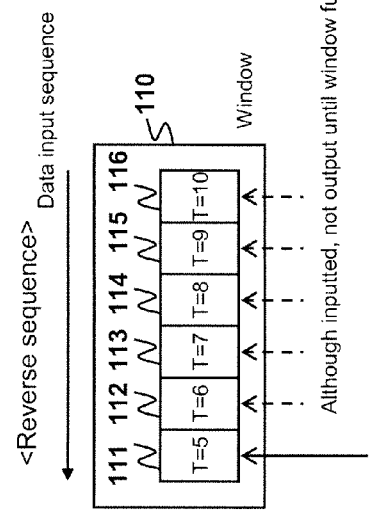

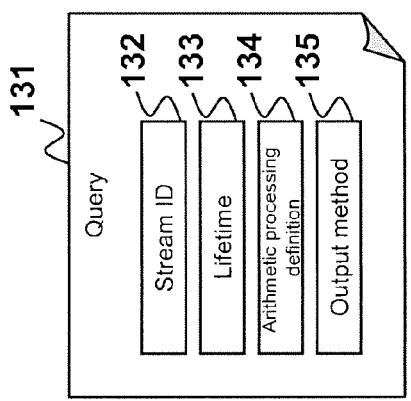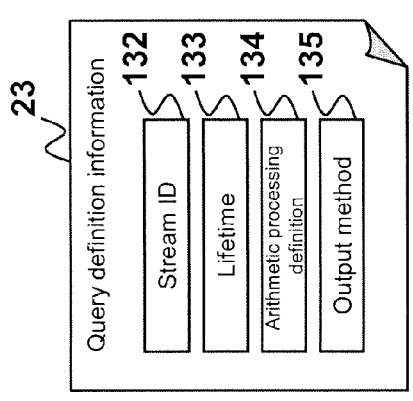

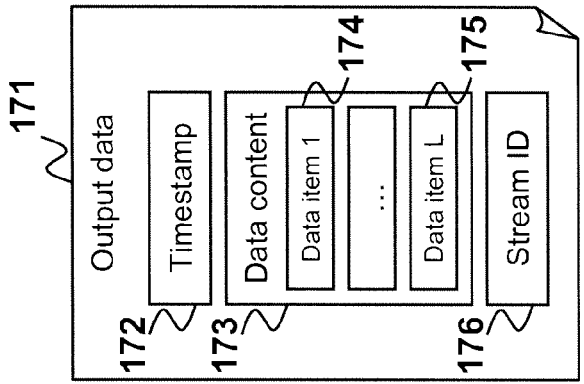
FIG.9A  FIG.9B
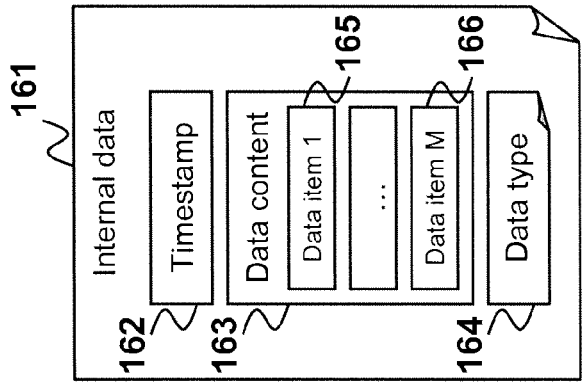
FIG.9C  FIG.9D
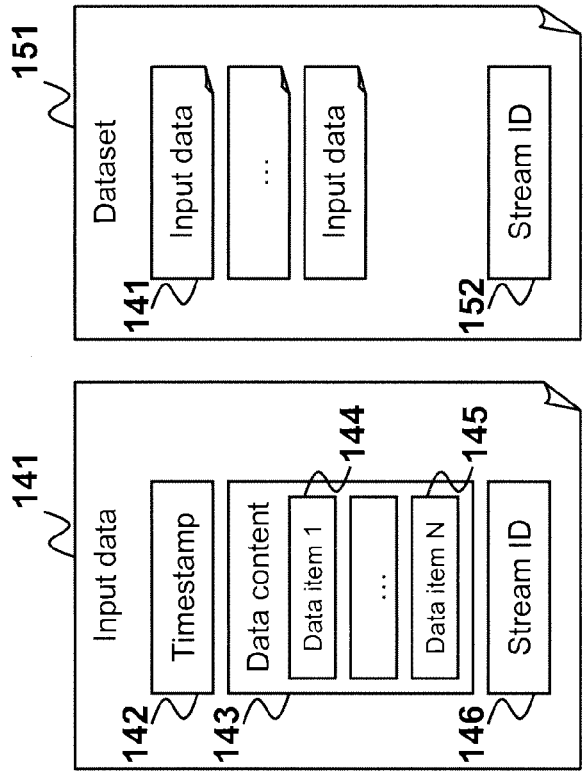

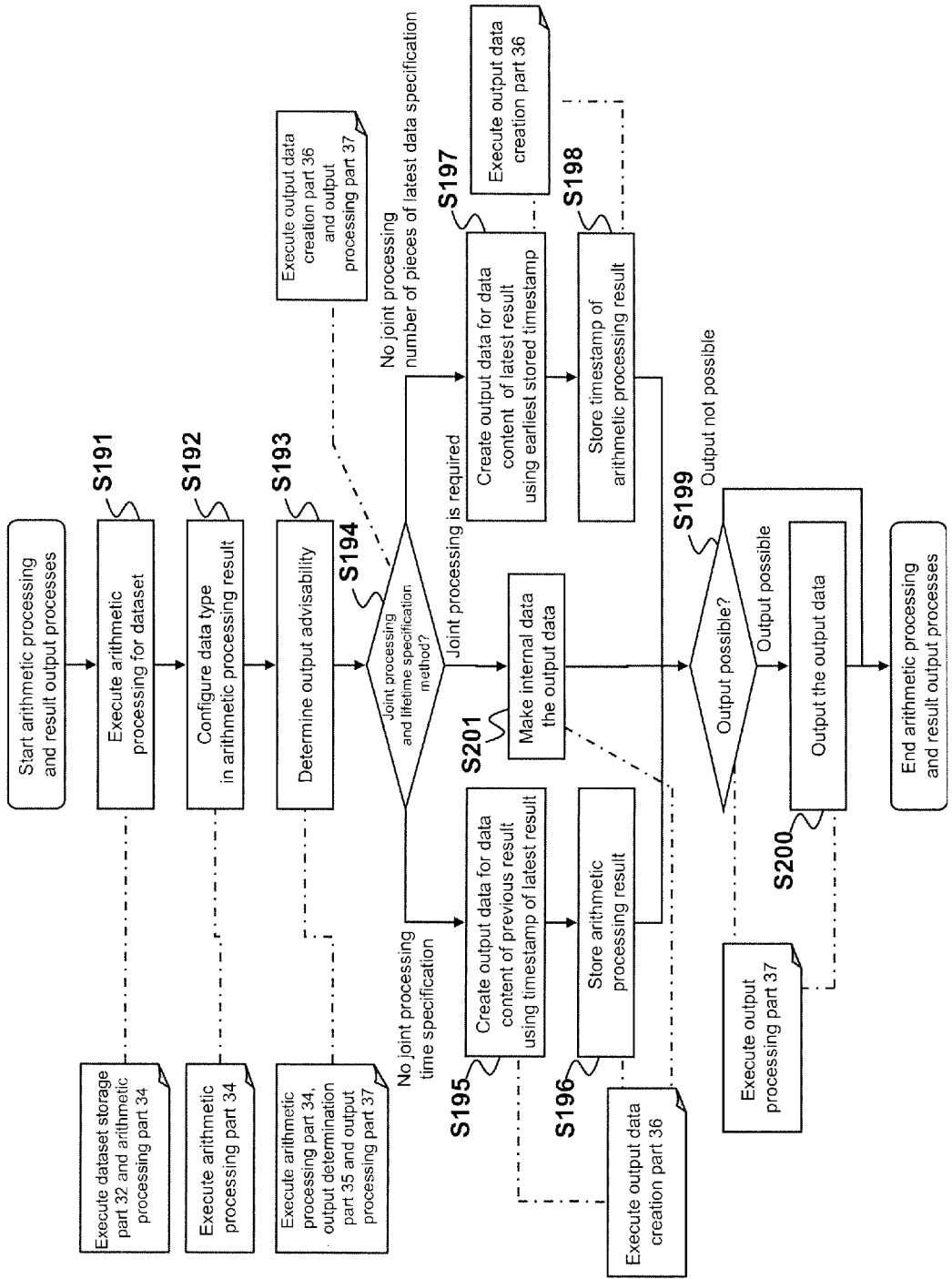

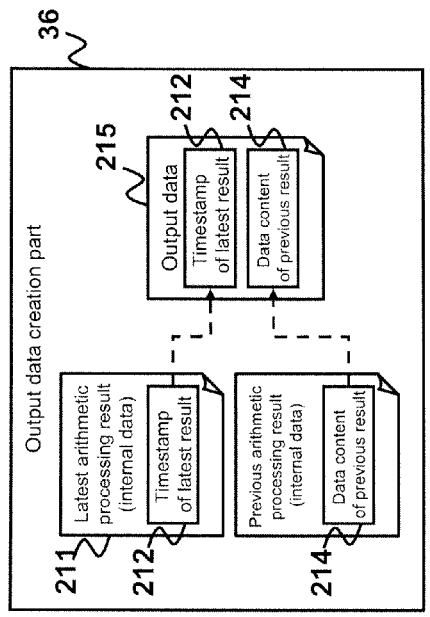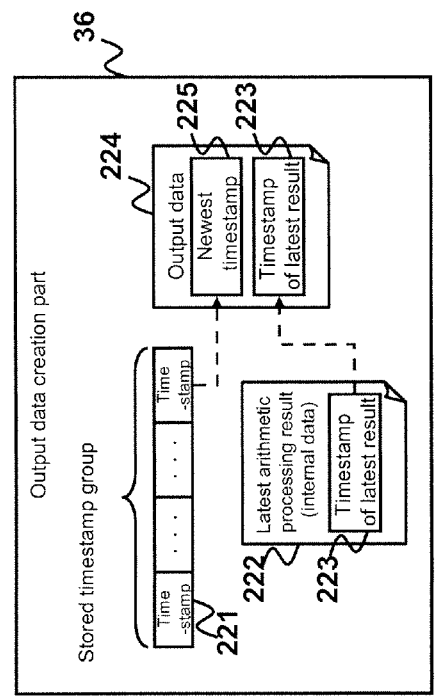

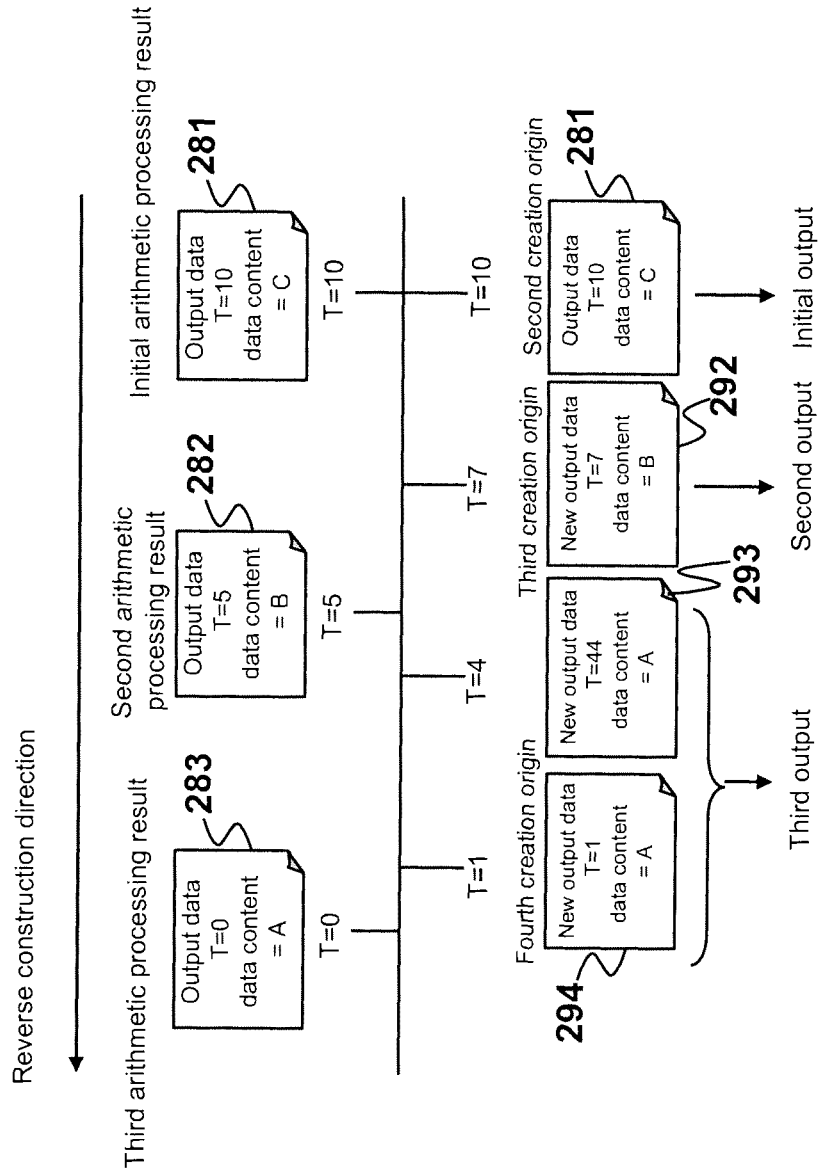

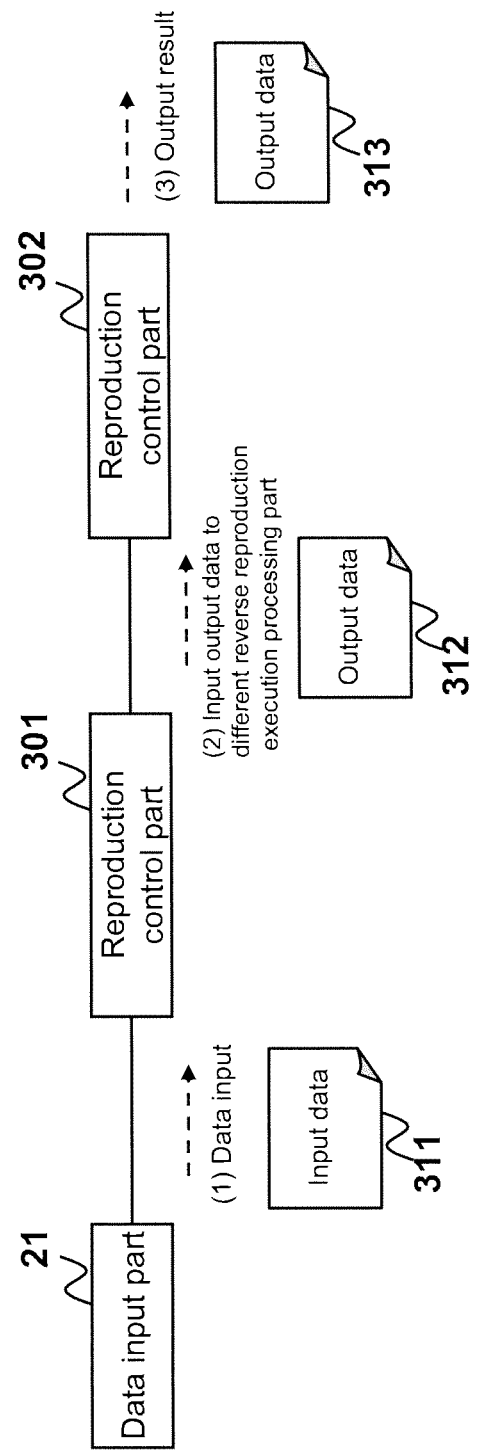

| Lifetime | Condition for normal dataset |
|---|---|
| Time specification | From point in time of latest timestamp data extinction, and thereafter. |
| Number of pieces of latest data specification | From point in time that data proportional to number of pieces of specified latest data inputted, and thereafter. |

| Data type | Output method | | |
| | Input | Extinct | Input/extinct | Fixed interval |
|---|---|---|---|---|
| Input | × | ○ | ○ | ○ |
| Extinct | ○ | × | ○ | ○ |

○ : true
× : false

DATA PROCESSING SYSTEM FOR REVERSE REPRODUCTION IN DATA STREAM PROCESSING

CROSS-REFERENCE TO RELATED PATENT APPLICATIONS

This application is a US national phase application of application PCT/JP 2010/001467 filed Mar. 3, 2010 which claims priority from Japan Priority Application 2009-124611 filed May 22, 2009. All of the aforesaid applications are incorporated herein by reference in their entirety as if fully set forth herein.

TECHNICAL FIELD

The present invention relates to data stream processing.

BACKGROUND ART

A computer system that performs data stream processing generally handles data that arrives from one moment to the next (hereinafter, may be referred to as time-series data). Time-series data is one element comprising stream data. In other words, stream data is an aggregation of time-series data.

Time-series data comprises a timestamp, which is information denoting the time that this time-series data occurred. In data stream processing, operations (for example, grouping, duplication removal, sum/difference/product set operations, a tabulation operation, and a join operation) are performed on time-series data.

However, since time-series data arrives endlessly, the stream data (large quantity of time-series data) must be separated into finite datasets. As a method for separating the stream data into finite datasets, for example, there is the sliding window method (for example, Non Patent Literature 1).

According to the sliding window method, the lifetime of the time-series data is configured. Data stream processing, for example, includes the following processes:

(1) A process for acquiring on the basis of the configured lifetime a window (a dataset) 42, which at a certain point in time will become an operation target, from inputted stream data 41 as shown in FIG. 2;
(2) a process for performing an operation on the time-series data (input data) 45 included in the dataset 42; and
(3) a process for sequentially outputting output data 46 inside a dataset 43 of output data 46 comprising the operation result.

As a result of this, stream data 44 is constructed using the sequentially outputted output data 46.

CITATION LIST

Non Patent Literature

[NPL 1]
B. Babcock, S. Babu, M. Datar, R. Motwani and J. W. Idom, "Models and issues in data stream systems," In Proc. of PODS 2002, pp. 1-16. (2002)

SUMMARY OF INVENTION

Technical Problem

Hereinbelow, for convenience sake, the expressions "old"/"new" will be used with respect to time. For example, a first time is older than a second time signifies that the first time is further in the past than the second time. Alternatively, a first time is newer than a second time signifies that the first time is further in the future than the second time.

Now then, time-series data (input data) arriving from one moment to the next is temporarily stored. Then, in a case where an event (for example, a failure or a symptom of a failure) has been detected, based on input data comprising a timestamp that denotes a time further in the past than the time at which the event was detected (hereinafter, the event detection time), a process (hereinafter, search process) for searching for a phenomenon related to the event (for example, the cause of the event, referred to hereinafter as event-related phenomenon) is performed. Specifically, for example, a time that constitutes a criterion (hereinafter, reference time) is configured, and the search process is performed on the basis of this time. In the search process, for example, input data, which comprise timestamps denoting times subsequent to the reference time, are processed chronologically (in the time axis direction). That is, multiple pieces of input data are processed in order from older-to-newer times denoted by the timestamps beginning from the input data comprising the oldest timestamp (the timestamp that denotes the oldest time of the timestamps denoting times subsequent to the reference time). The event-related phenomenon, for example, is discovered from the output data created based on the input data related to the event-related phenomenon.

Because the event-related phenomenon is a phenomenon that is discovered in the search process, normally it is not possible to know the time that the event-related phenomenon occurred (hereinafter, event-related time) prior to the start of the search process. This makes it difficult to configure the reference time.

When the time between the event detection time and the reference time is long, most likely the reference time will be a time that is further in the past than the event-related time, and therefore the event-related phenomenon will most likely be discovered in accordance with the search process. However, in this case, there is likely to be a large quantity of time-series data that will have to be processed before the event-related phenomenon is found, and therefore, it will probably take a long time for the event-related phenomenon to be found.

Alternatively, when the time between the event detection time and the reference time is short, most likely the reference time will be a time that is further in the future than the event-related time, and therefore the event-related phenomenon will most likely not be discovered in accordance with the search process. In this case, it is necessary to change the reference time and perform the search process once again. When the search process has to be performed again, it will ultimately take a long time until the event-related phenomenon is found.

Consequently, an object of the present invention is to shorten the time required to find a phenomenon related to a detected event.

Solution to Problem

Multiple pieces of input data are processed in order from newer-to-older times denoted by the timestamps within the input data beginning from the input data comprising the timestamp that denotes the newest time of the timestamps denoting times prior to the reference time (for example, the event detection time) (hereinafter, latest reference stamp). That is, reverse reproduction is performed in the data stream processing.

"Reverse reproduction in data stream processing" is reproduction in the reverse order from the forward reproduction in data stream processing.

"Forward reproduction in data stream processing" is chronological (hereinafter, may be referred to as "forward order") reproduction. Specifically, forward reproduction in data stream processing is a process performed by inputting multiple pieces of input data into a dataset (window) in order from older-to-newer times denoted by the timestamps in the input data as shown in FIG. 3A, and the result of this processing is that multiple pieces of output data (51 through 55) that have been created are outputted in order from older-to-newer times denoted by the timestamps in the output data (T=1, 2, 3, 4, 5). In accordance with this, the input data is processed in the time axis direction having a certain time as a reference.

Alternatively, "reverse reproduction in data stream processing" is reproduction in reverse chronological order (hereinafter, may be referred to as "reverse order"). Specifically, reverse reproduction in data stream processing, as shown in FIG. 3B, is inputting input data into a dataset in order from newer-to-older times denoted by the timestamps in the input data, processing the inputted input data, and as a result of this processing, outputting multiple pieces of output data (61 through 65) that have been created in order from newer-to-older times denoted by the timestamps in the output data (T=5, 4, 3, 2, 1). The results of the output data processing here are the same as the results of the processing for the output data with the same timestamps as at forward reproduction. In accordance with this, the input data is processed in reverse order to the time axis direction having a certain time as a reference.

According to the present invention, multiple pieces of input data are processed in reverse order (that is, an order that goes backward in time) beginning from input data comprising the latest reference stamp. This makes it possible to shorten the time required for discovering the event-related phenomenon.

Furthermore, when employing reverse reproduction in data stream processing, it is desirable to keep in mind a number of points, for example, the following four points. Furthermore, in the following explanation, it is supposed that one piece of input data comprises a timestamp (T) and a value (V), and that one piece of output data created in accordance with an operation that uses one or multiple pieces of input data comprises the total of the timestamp(s) (T) and the value(s) (V). Therefore, it is supposed that the operation is a tabulation.

<First Point To Keep In Mind>

A first point to keep in mind relates to the creation of the output data.

As shown in FIG. 4A, when input data (71 and 72) is inputted during forward reproduction, the results of the operation on the input data that exist at this time are outputted (73 and 74). For example, in a case where the input data 71 has been inputted, the only input data that exists is the input data 71, and therefore the output data 73, which comprises the same timestamp and value (T=1, total=1) as the input data 71 is outputted. Next, in a case where the input data 72 has been inputted, since the existing input data are the input data 71 and 72, the output data 74, which comprises the timestamp T=2 of the input data 72, and a total of 3, which is the total of the value V=1 of the input 71 and the value V=2 of the input data 72, is outputted.

The dataset of the operation-target input data (71 and 72) at this time is a set of data generated during a period that extends back into the past from a certain point in time. That is, when the input data 72 was inputted, the input data 71, which was generated further in the past than this data, existed in the operation-target dataset.

Therefore, simply performing an operation by inputting input data in the reverse direction of the time axis (that is, simply performing reverse reproduction) does not enable the operation result to be reproduced properly. Specifically, for example, as shown in FIG. 4B, since the input data is inputted in the newer-to-older order of the times denoted by the timestamps in the reverse reproduction, the input data 82 is inputted, and thereafter, the input data 81 is inputted. When the input data 82 is inputted, normally the input data 81 should exist in the operation-target dataset, but the operation is performed in a state in which the input data 81 does not exist. For this reason, the output data 84, which comprises an incorrect total of 2, is outputted. Furthermore, although the input data 82 should not exist in the operation-target dataset when the input data 81 is inputted, the operation is performed in a state in which this input data 82 exists. For this reason, the output data 83, which comprises an incorrect total of 3, is outputted.

Consequently, reverse reproduction must be performed by taking the lifetime of the input data into account. The lifetime, for example, is specified (expressed) using either a time period or the latest number of pieces of data. The "latest number of pieces of data" is the maximum number of pieces of input data that can be put into a dataset (window).

In a case where the lifetime is specified using a time period, the timestamp inside the input data is corrected. The time denoted by the post-correction timestamp is a time computed by adding the lifetime to the time denoted by the pre-correction timestamp. The time denoted by the post-correction timestamp is the extinction time in the forward order (the time at which the input data becomes extinct in forward reproduction), in other words, the input time in the reverse order (the time denoted by the timestamp inside the input data in reverse reproduction). Alternatively, the time denoted by the pre-correction timestamp is the input time in the forward order (the time denoted by the timestamp inside the input data in forward reproduction), in other words, the extinction time in the reverse order (the time at which this input data becomes extinct in reverse reproduction). Therefore, in reverse reproduction, the input data becomes extinct at the time denoted by the pre-correction timestamp inside this input data (in other words, the time obtained by the lifetime having been added to the time denoted by the post-correction timestamp inside this input data). As shown in FIG. 4C, the operation is performed as though the input data (92 and 91) do not exist at the times (T=5, T=4) denoted by the post-correction timestamp inside these input data, and the operation is performed as though the input data (92 and 91) do exist at the times (T=2, T=1) denoted by the pre-correction timestamp (in the example of FIG. 4C, the lifetime is 3). As a result of this, it is possible to correctly reproduce the state of the operation-target dataset at the points in time of the input times in forward reproduction (T=2, T=1), that is, the original output data (93 and 94) can be obtained. The output data (93 and 94) are outputted in the order of output data 94 and 93. That is, the same output data 93 and 94 as the output data 73 and 74 outputted in forward reproduction are outputted in reverse order from the case of the forward reproduction.

In a case where the lifetime is specified using the number of pieces of latest data, when the input data is inputted in the newer-to-older order of the times denoted by the timestamps inside the input data, the state of the dataset is not the state of the time denoted by the timestamp inside the input data that was inputted to this dataset last, but rather is the state at the time denoted by the timestamp inside the input data initially inputted to this dataset. That is, the time corresponding to the state of the dataset is displaced in accordance with the number of pieces of latest data. Therefore, in accordance with this, the timestamp inside the output data must be corrected in accordance with the specified number of pieces of latest data.

<Second Point To Keep In Mind>

A second point to keep in mind relates to the timing for outputting the output data.

As shown in FIG. 5A, in the forward reproduction, output data (data comprising operation results) can be outputted every time the input data (101 through 103) is inputted into the window (dataset) 100.

However, as shown in FIG. 5B, in the reverse reproduction, even though the input data comprising T=10 is inputted to the window 110, a correct operation result is not obtained at this point in time. In this case, the output of the latest operation result must start at the point in time at which the dataset is reproduced correctly, that is, the point in time at which a number of pieces of input data (111 through 116) corresponding to that specified by the lifetime of the data (for example, 6) has been inputted to the window 110.

Consequently, in a case where the lifetime has been specified using a time period, when input data comprising a timestamp denoting the latest time has been inputted into the dataset in the forward order in the forward reproduction, this dataset transitions to the latest state. Alternatively, in the reverse reproduction, when input data comprising a timestamp denoting the latest time of the input data inputted into the dataset becomes extinct, this dataset transitions to the latest state. Therefore, subsequent latest operation results (output data) are outputted from the point in time at which the input data comprising the timestamp denoting the latest time becomes extinct.

In a case where the lifetime is specified using the number of pieces of latest data, when the inside of the dataset is full of input data, that is, when input data corresponding to the specified number of pieces of latest data has been inputted, this dataset is the latest state. Subsequent latest operation results (output data) are outputted from this point in time.

<Third Point To Keep In Mind>

A third point to keep in mind relates to synchronization when joining datasets. That is, when the lifetime of the data and the output timing are taken into account, there are cases where the states of datasets will deviate at some point in time (a timestamp) between multiple datasets at the point in time when a certain input data is inputted. Therefore, when multiple datasets are joined, the datasets must be synchronized by taking into account the point in time at which the states of the datasets deviate.

<Fourth Point To Keep In Mind>

A fourth point to keep in mind relates to the relationship between an output timing specified by the user and the output timing during reverse reproduction. Specifically, for example, in a case where the user specifies that operation results be outputted when the input data has been inputted, in the reverse reproduction the operation results are outputted when the input data becomes extinct. Alternatively, in a case where the user specifies that operation results be outputted when the input data becomes extinct, in the reverse reproduction the operation results are outputted when the input data is inputted.

Data stream processing technology related to the present invention can be expected to be employed in a variety of fields, such as, for example, the prediction of stock price based on stock trading data, the prediction of traffic jams using operational data (for example, data denoting speed, direction of travel, and so forth) collected from large numbers of vehicles, the monitoring of Web server accesses, the monitoring of the operating status of machines and equipment, traffic control for vehicles in the distribution industry, the preparation of new management indicators based on accumulated business data (data related to business), and the discovery of anomalous patterns based on multiple pieces of diagnosis data that has been collected (for example, the electrocardiograph data, scanned image data, and so forth of multiple patients).

BRIEF DESCRIPTION OF DRAWINGS

FIG. 1 shows a configuration of a computer system 3 that uses a data processing system related to an embodiment of the present invention.

FIG. 2 is an illustration of data stream processing.

[FIG. 3]

[FIG. 4]

FIG. 4A shows a specific example of the results of forward reproduction. FIG. 4B shows a specific example of the results of simple reverse reproduction. FIG. 4C shows a specific example of the results of a reverse reproduction in which lifetime is taken into account.

[FIG. 5]

FIG. 5A is an illustration of the times at which outputting is possible in a forward reproduction. FIG. 5B is an illustration of the time at which outputting is possible in a reverse reproduction.

FIG. 6 shows the data structure of a data storage device 4.

FIG. 7 shows the data structure of a query storage device 5.

[FIG. 8]

FIG. 8A shows the data structure of a query 131. FIG. 8B shows the data structure of query definition information 23.

[FIG. 9]

FIG. 9A shows the data structure of input data 141. FIG. 9B shows the data structure of a dataset 151. FIG. 9C shows the data structure of internal data 161. FIG. 9D shows the data structure of output data 171.

FIG. 10 shows the flow of data inside a reproduction control program 16.

FIG. 11 shows the flow of processing for inputting input data 141.

[FIG. 12]

FIG. 12 shows the flows of processing for an operation and a data output.

[FIG. 13]

FIG. 13 shows a method for creating output data 171 in a case where a synchronization process need not be performed, and, in addition, a lifetime 133 is specified using a time period.

[FIG. 14]

FIG. 14 shows a method for creating output data 171 in a case where a synchronization process need not be performed, and, in addition, a lifetime 133 is specified using the number of pieces of latest data.

FIG. 15 shows the flow of processing for an output advisability determination (when an output method 135 is not specified).

FIG. 16 shows the flow of processing for synchronizing a dataset 151.

FIG. 17 shows a specific example of a process within a dataset 151 synchronization process in which synchronization is actually performed after a combination of a timestamp 142 and a copy of a dataset 151 targeted for a join operation have been stored in a dataset storage part 32.

FIG. 18 shows the flow of processing for an output advisability determination (when an output method 135 is specified).

FIG. 19 shows the flow of output processing in a case where "fixed interval" is specified as the output method 135.

[FIG. 20]

FIG. 20 shows specific examples of Step S273 and Step S274 of FIG. 19.

[FIG. 21]

FIG. 21 shows the flow of a query linkage process.

[FIG. 22]

FIG. 22 shows a table listing conditions under which a first condition (condition for a dataset to be normal) is true.

[FIG. 23]

FIG. 23 shows a table listing conditions under which a second condition (relationship between output method 135 in query definition information 23 and data type 164 of operation results) is true or false.

FIG. 24 is an illustration of one effect of performing reverse reproduction in data stream processing.

FIG. 25 shows a specific example of processing in a dataset 151 synchronization process up to the storage of a combination of a timestamp 142 and a copy of a dataset 151 targeted for a join operation in a dataset storage part 32 in a case where the lifetime is specified using a time period.

FIG. 26 shows a specific example of processing in a dataset 151 synchronization process up to the storage of a combination of a timestamp 142 and a copy of a dataset 151 targeted for a join operation in a dataset storage part 32 in a case where the lifetime is specified using a number of pieces of latest data.

DESCRIPTION OF THE EMBODIMENT

Figure 1:
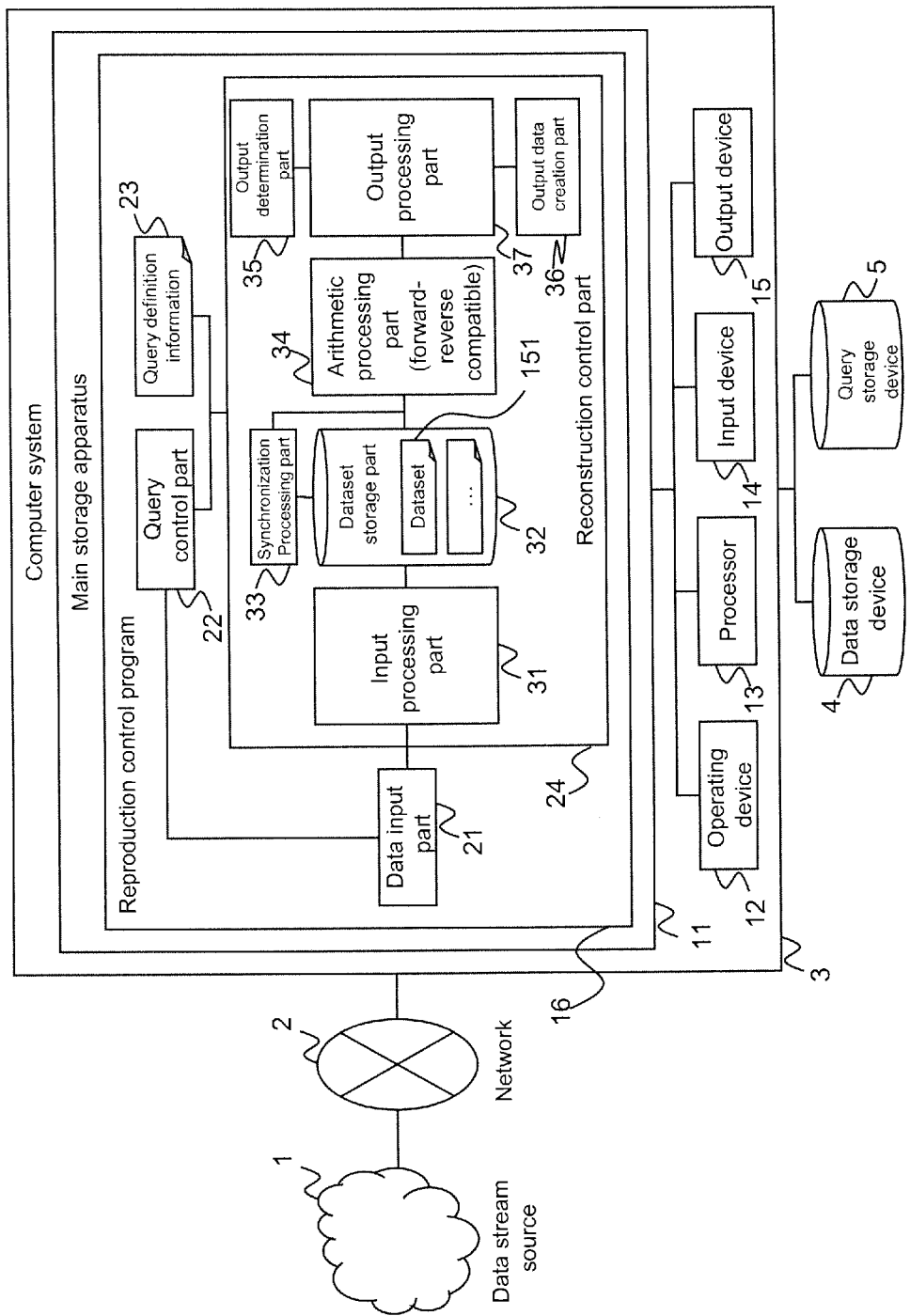
[FIG. 1]
Figure 2:
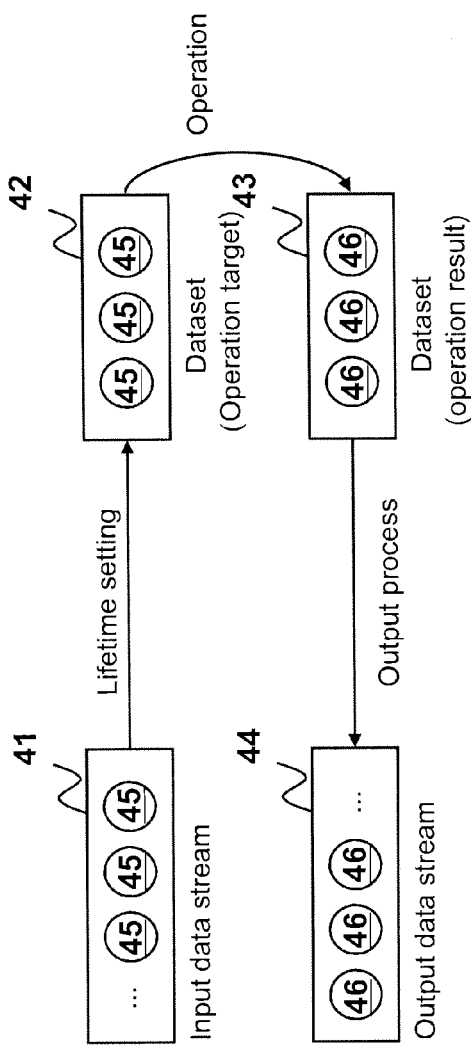
[FIG. 2]
Figure 3B:
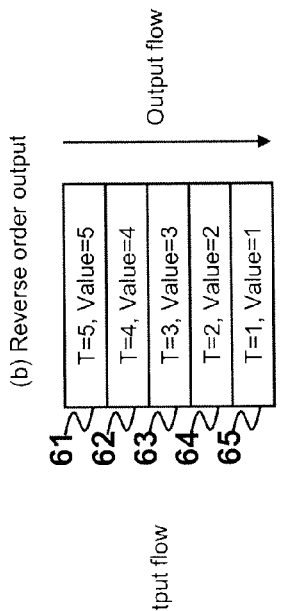
FIG. 3B shows the results of reverse reproduction.
Figure 3A:
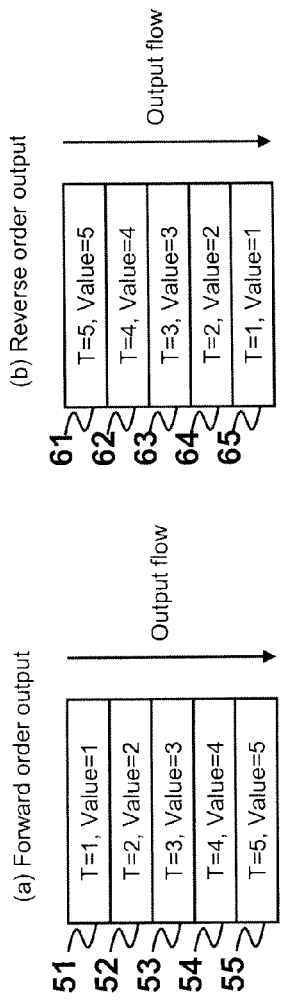
FIG. 3A shows the results of forward reproduction.

FIG. 1 shows the configuration of a computer system 3 that uses a data processing system related to an embodiment of the present invention.

The computer system 3 comprises either one or multiple computers. The computer system 3, for example, comprises a first monitoring system and a second monitoring system. The first monitoring system processes a first data stream configured from time-series data comprising simplified information, and the second monitoring system processes a second data stream configured from time-series data comprising detailed information. The first monitoring system detects an event of some sort in accordance with processing the first data stream, and the second monitoring system searches for a phenomenon related to the event detected by the first monitoring system in accordance with processing the second data stream. At least one of the first and second monitoring systems can be realized using a computer program. A reproduction control program 16, which will be described further below, corresponds to the second monitoring system.

The computer system 3 receives time-series data over a network from either one or multiple data stream sources 1.

The data stream source 1 sends time-series data from one moment to the next. The time-series data, for example, comprises a value (information) acquired from a device such as a temperature sensor, and a timestamp denoting a time prepared in accordance with this time-series data.

A data storage device 4 and a query storage device 5 are coupled to the computer system 3. The data storage device 4 and the query storage device 5, for example, may be realized in accordance with an external storage device(s) coupled to the computer system 3 or may be realized in accordance with a storage device(s) built into the computer system 3. The data storage device 4 and the query storage device 5 may be realized as separate storage devices, or may be realized as a single storage device.

Figure 6:
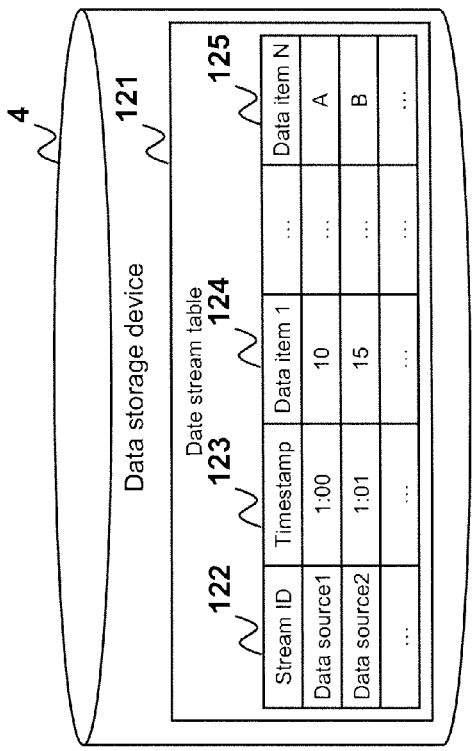
[FIG. 6]

Time-series data received from the data stream source 1 is stored in the data storage device 4. The data structure of the data storage device 4 is shown in FIG. 6. The data storage device 4 stores a data stream table 121. The data stream table 121 comprises a stream ID (122), a timestamp (123), and data item 1 (124) through data item N (125) (where N is a natural number) for each piece of time-series data. The stream ID (122) is the identifier of the data stream source 1 that is the transmission source of the time-series data. The timestamp 123 is the time denoted by the timestamp of the time-series data. Data item 1 (124) through data item N (125) show the values included in the time-series data. Furthermore, it is also possible to have a case in which there is only one data item. Furthermore, the time-series data is not limited to management using a table format like this, but rather may be managed using various other formats.

Figure 7:
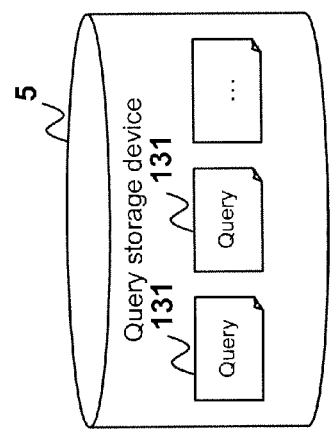
[FIG. 7]

The query storage device 5 stores a query 131. The query 131 is described using a specific language, for example, the declarative retrieval language CQL (Continuous Query Language), which is similar to SQL (Structured Query Language). The query storage device 5 is a file system, and as shown in FIG. 7, stores a query 131 with a filename attached in a file format. The query 131 is analyzed, and query definition information, which is information denoting the result of the analysis, is deployed on a main storage apparatus 11.

FIG. 8A shows the data structure of the query 131, and FIG. 8B shows the data structure of the query definition information 23. The information included in both the query 131 and the query definition information is substantially the same, and as such, the same reference signs are assigned to the same types of information.

The query 131 and the query definition information 23 comprise a stream ID (132), a lifetime (133), an operation definition (134) and an output method (135).

The stream ID (132) is information showing the data stream source 1 from which the time-series data to be analyzed by the query 131 was sent (that is, the identifier of the data stream source 1).

The lifetime (133) is information denoting the lifetime of the time-series data. A number of methods for specifying (expressing) the lifetime 133 are conceivable, but in this embodiment, is specified by either of a time period or a number of pieces of latest data.

The operation definition (134) is information denoting the type of operation to be performed with respect to the time-series data.

The output method (135) is information denoting how an operation result is to be outputted. A value, which is specified as the output method (135), for example, is any of an "input time", which outputs an operation result when the time-series data is inputted, an "extinction time", which outputs an operation result when the time-series data becomes extinct, an "input time/extinction time", which outputs an operation result at both the input time and the extinction time, and a "fixed interval", which outputs an operation result at fixed time intervals.

Refer to FIG. 1 once again. The computer system 3 comprises a main storage apparatus 11, an operating device 12, a processor 13, an input device 14, and an output device 15.

The operating device 12 is a man-machine interface. Specifically, for example, the operating device 12 receives a search process instruction from the user. Upon receiving the search process instruction, the operating device 12 notifies a query control part 22 and a data input part 21, which will be described further below, of the search process instruction.

The processor 13 is typically a microprocessor, and executes a reproduction control program 16 loaded into the main storage apparatus 11. This program 16 is installed from a portable storage medium (for example, a CD-ROM) or a program source such as a remote server.

The input device 14 receives time-series data inputted from either the data stream source 1 or the data storage device 4. This time-series data is inputted to an input processing part 31, which will be described further below. Also, the input device 14 receives a query 131 stored in the query storage device 5. This query 131 is inputted to a query control part 22, which will be described further below.

The output device 15 outputs to the outside of the computer system 3 output data outputted by an output processing part 37, which will be described further below.

The main storage apparatus 11 stores the reproduction control program 16. The reproduction control program 16 comprises functions such as the data input part 21, the query control part 22, and a reproduction control part 24. Any of the data input part 21, the query control part 22, and the reproduction control part 24 (an input processing part 31, a dataset storage part 32, a synchronization processing part 33, an operation processing part 34, an output processing part 37, an output determination part 35, and an output data creation part 36, which will be described further below), or at least any portion of these may be realized in accordance with hardware by creating an integrated circuit. In the following explanation, it is supposed that in a case where a computer program is the subject, the processing is actually performed by the processor 13 executing this computer program.

Data used by the reproduction control program 16 includes input data 141 shown in FIG. 9A, a dataset 151 shown in FIG. 9B, internal data 161 shown in FIG. 9C, and output data 171 shown in FIG. 9D.

The input data 141 is time-series data inputted from the data storage device 4 (that is, one data element of the inputted data stream). The input data 141 comprises a timestamp (142), a data content (143), and a stream ID (146). The timestamp (142) is a timestamp 123, which is registered in the table 121 shown in FIG. 6. The data content (143) comprises data item 1 (144) through data item N (145), and these are the data item 1 (124) through data item N (125), which are registered in this table 121. The stream ID (146) is the stream ID (122), which is registered in this table 121.

The dataset 151 is a set of input data 141, which constitutes the operation target of the operation definition 134 described in the query 131. The dataset 151 comprises a stream ID (152) in addition to the input data 141. The stream ID (152) is the stream ID (132) of the query 131 corresponding to this dataset 151. That is, a dataset 151 is created for each query 131.

The internal data 161 is used for transferring an operation result within the reproduction control program 16. The internal data 161 comprises a timestamp (162), a data content (163), and a data type (164). The timestamp (162) denotes a time decided on the basis of the timestamp(s) 142 inside one or multiple pieces of input data 141 that constitute(s) the basis of this internal data 161. The data content (163) comprises operation results from data item 1 (165) to data item M (166). The data type (164) is information denoting the type of the operation result. As the data type (164), for example, there is "input" and "extinct". The data type "input" signifies that the operation result inside the internal data 161 is the operation result of the time when the new input data was inputted (added) to the dataset 151. The data type "extinct" signifies that the operation result inside the internal data 161 is the operation result of the time when the input data 141 for which the lifetime ended became extinct in the dataset 151.

The output data 171 is data outputted as an operation result. The output data 171 is the same as the input data 141, and has a timestamp (172), a data content (173), and a stream ID (176). The timestamp (172) is a time decided on the basis of the timestamp(s) 142 inside one or multiple pieces of input data 141 that constitute(s) the basis of this output data 171, and specifically, is the timestamp (162) in the internal data 161 corresponding to this output data 171. The data content (173) comprises operation results from data item 1 (174) to data item L (175). These data items, specifically, are the data item 1 (165) to data item M (166) included in the data content (163) in the internal data 161 corresponding to this output data 171. The stream ID (176) shows the ID of a data string when the output data 171 is regarded as the time-series data, and is allocated by the output processing part 37, which will be described further below.

Figure 10:
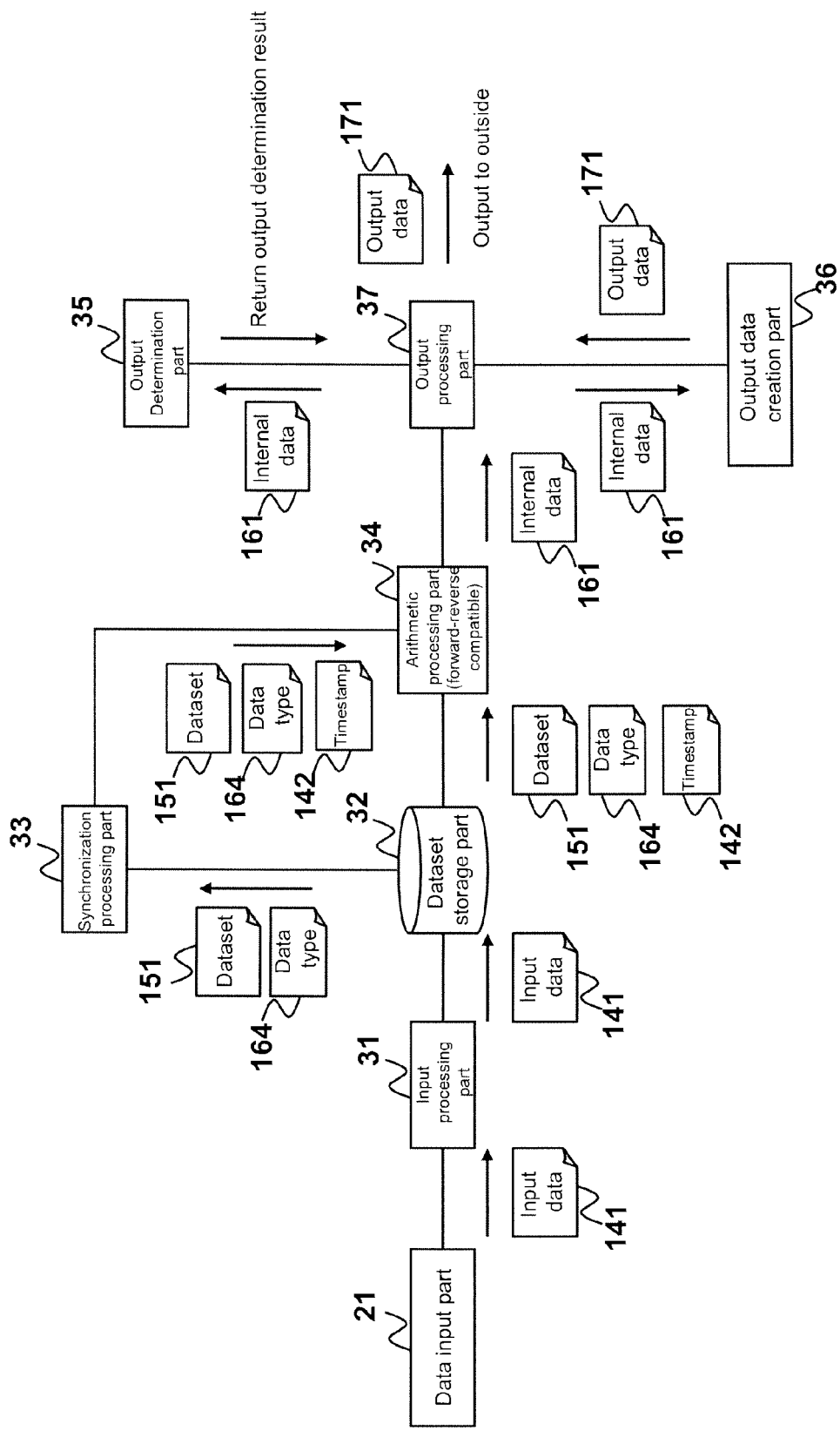
[FIG. 10]

FIG. 10 shows the flow of data in the reproduction control program 16.

The input data 141 is inputted to the input processing part 31 from the data input part 21, and is stored in the dataset storage part 32 from the data processing part 31. Then, the dataset 151, which is at aggregation of the input data 141, is inputted from the dataset storage part 32 to the operation processing part 34 either by way of or not by way of the synchronization processing part 33. When the dataset 151 is inputted from the dataset storage part 32 to the operation processing part 34, and when the dataset 151 is inputted from the synchronization processing part 33 to the operation processing part 34 here, the data type 164 and the timestamp 142, which shows the state of the dataset 151 at a certain time, are inputted together. Also, when the dataset 151 is inputted from the dataset storage part 32 to the synchronization processing part 33, the data type 164 is also inputted together with the dataset 151. The internal data 161 is inputted from the operation processing part 34 to the output processing part 37, and is inputted from the output processing part 37 to the output determination part 35 and the output data creation part 36. The output data 171 is created in accordance with the output data creation part 36, and is inputted to the output processing part 37. The output data 171 inputted to the output processing part 37 is outputted to the outside of the reproduction control program 16.

The query control part 22 shown in FIG. 1, for example, receives a search process instruction (for example, a reverse reproduction instruction) and a query 131 filename via the operating device 12. Upon receiving the filename, the query control part 22 acquires the query 131 comprising the filename specified by the user from the query storage device 5 via the input device 14. In a case where the query 131 has been acquired, the query control part 22 analyzes this query 131 and stores query definition information 23 (refer to FIG. 8B) denoting the result of this analysis (for example, stores this information in the main storage apparatus 11). The query control part 22 transfers the query definition information 23 to the reproduction control part 24, and issues a data input instruction to the data input part 21. When issuing the instruction to the data input part 21, the query control part 22 transfers the stream ID (132) inside the query definition information 23.

The data input part 21, upon receiving the data input instruction and the stream ID (132) from the query control part 22, acquires the input data 141 comprising the stream ID (132) transferred from the query control part 22 in order from newer-to-older times denoted by the timestamps 123 from the data storage device 4 via the input device 14, and inputs the acquired input data 141 to the input processing part 31.

The reproduction control part 24 controls reproduction during data stream processing based on the content of the query definition information 23 transferred from the query control part 22. Reproduction, as mentioned hereinabove, includes forward reproduction and reverse reproduction. The reproduction control part 24 the reproduction control part 24 comprises the input processing part 31, the dataset storage part 32, the synchronization processing part 33, the operation processing part 34, the output processing part 37, the output determination part 35, and the output data creation part 36. These functions (31 through 37) can reference the query definition information 23.

The input processing part 31 receives input data 141 from the data input part 21, and references the lifetime 133 in the query definition information 23. In a case where the lifetime 133 is specified in accordance with a time period, the input processing part 31 computes the extinction time in the forward order by adding the lifetime 133 to the time denoted by the timestamp 142 in the input data 141, corrects the timestamp 142 to a timestamp 142 denoting the extinction time in the forward order, and inputs the input data 141 comprising the post-correction timestamp to the dataset storage part 32. In a case where the lifetime 133 is specified using the number of pieces of latest data, the input processing part 31 inputs the input data 141 to the dataset storage part 32 as-is.

The dataset storage part 32 references the stream ID (132) in the query definition information 23, and stores the dataset (window) 151 having a stream ID (152) that is the same as this stream ID (132). Also, the dataset storage part 32 receives the input data 141 from the input processing part 31, and adds this input data 141 to the dataset 151 comprising the same stream ID (152) as the stream ID (146) in this input data 141. The dataset storage part 32 also deletes, from among the input data 141 in the dataset 151, the input data 141 for which the period of time denoted by the lifetime 133 in the query definition information 23 corresponding to this dataset 151 has elapsed. At the time of the addition and deletion of this input data 141, the dataset storage part 32 transfers the dataset 151 for which this addition or deletion was performed to the operation processing part 34. In so doing, in the case of the addition of the input data 141, the dataset storage part 32 transfers the data type 164 "input" to the operation processing part 34 together with this dataset 151. Alternatively, in the case of the deletion of the input data 141, the dataset storage part 32 transfers the data type 164 "extinct" together with the dataset 151 to the operation processing part 34. The dataset storage part 32 also transfers the timestamp 142, which shows the state of this dataset 151 at certain times, to the operation processing part 34 together with this dataset 151. However, in a case where the dataset 151 has been identified from the query definition information 23 as being the target of a join operation, and, in addition, requiring synchronization, the dataset storage part 32 does not transfer the dataset 151 to the operation processing part 34 even though input data 141 has either been added to or deleted from the dataset 151. This dataset 151 is transferred to the synchronization processing part 33. Here, in the case of the addition of the input data 141, the dataset storage part 32 transfers the data type 164 "input", and in the case of the deletion of the input data 141, transfers the data type 164 "extinct" to the synchronization processing part 33 together with the dataset 151.

Since timestamp deviation occurs in a case where the synchronization processing part 33 references the query definition information 23 and performs a join operation with respect to multiple datasets 151 in accordance with the operation definition 134, dataset 151 synchronization is performed, and the synchronized multiple datasets 151 are transferred to the operation processing part 34. When the input data 141 is either added to or deleted from the dataset 151 stored in the dataset storage part 32, the synchronization processing part 33 first stores a copy of this dataset 151 in the dataset storage part 32. In so doing, the synchronization processing part 33 also acquires a stored copy of a dataset 151 having the input data 141 of a different system, and transfers this acquired dataset 151 copy and the copy of the dataset 151 for which the input data 141 was either added or deleted to the operation processing part 34. In so doing, in the case of an input data 141 addition, the data type 164 "input" is transferred to the operation processing part 34 together with the copy of the dataset 151, and alternatively, in the case of an input data 141 deletion, the data type 164 "extinct" is transferred to the operation processing part 34 together with the copy of the dataset 151. After the dataset 151 copy has been transferred to the operation processing part 34, the synchronization processing part 33 deletes the copy of the other system dataset 151 that was acquired.

The operation processing part 34 receives either one or multiple datasets 151 and data types 164 from either the dataset storage part 32 or the synchronization processing part 33. The operation processing part 34 performs an operation using the received dataset 151 in accordance with the operation definition 134 in the query definition information 23. The operation processing part 34 transfers internal data 161 comprising the operation result and the received data type 164 to the output processing part 37.

The output determination part 35 receives the internal data 161 from the output processing part 37, determines whether or not the operation result may be outputted, and returns the determination result to output processing part 37. The following first and second conditions must both be satisfied as the condition for determining that the operation result is able to be outputted. The internal data is used to execute determination under the second condition.

The first condition is that the dataset 151 is a normal state. In a case where the input data 141 has been processed in the forward order, the normal latest state of the dataset 151 is the state at the time at which the latest input data was inputted to this dataset 151. In table 321 of FIG. 22, a condition under which the first condition constitutes true (that is, a condition under which the first condition is satisfied) is shown. The dataset 151 is assessed as being a normal state in the synchronization processing part 33 in a case where a joint process is defined in the operation definition 134 of the query definition information 23. The first condition is always determined to be true in the output determination part 35 in this case.

That is, in a case where the lifetime 133 is specified in accordance with a time period, and, in addition, the input data 141 has been inputted to the dataset 151 in the reverse order, the generation time and extinction time of the input data 141 switch places. In accordance with this, the normal latest state of the dataset 151 is the state at the extinction time of the latest input data 141. For this reason, the first condition is determined to be true from the point in time at which the input data 141 (initially inputted input data) comprising the timestamp 142 denoting the latest time has become extinct.

In a case where the lifetime 133 is specified using the number of pieces of latest data, the first condition is determined to be true on and after the point in time at which input data corresponding to the specified number of pieces of latest data has been inputted to the dataset 151 (the point in time at which an operation result corresponding to the number of pieces of latest data was acquired).

The second condition is the relationship between the output method 135 in the query definition information 23 and the data type 164 of the operation result. The condition under which the second condition constitutes true (that is, the condition under which the second condition is satisfied) is shown in table 331 of FIG. 23.

That is, in a case where the output method 135 is "data input time", an operation result must be outputted at the time the input data 141 is inputted in the forward order, that is, the time the input data 141 becomes extinct in the reverse order. For this reason, when the data type 164 is "extinct" in this case, the second condition is determined to be true.

In a case where the output method 135 is "data extinction time", the operation result must be outputted at the time the input data 141 becomes extinct in the forward order, that is, at the time the input data 141 is inputted in the reverse order. For this reason, when the data type 164 is "input" in this case, the second condition is determined to be true.

In a case where the output method 135 is either "data input/extinction time" or "fixed interval", and in a case where the output method 135 has not been specified, the second condition is always true.

The output determination part 35 determines that output is possible when both the first condition and the second condition are true. In a case where either of the conditions is false, the output determination part 35 determines that output is not possible. The determination result is returned to the output processing part 37.

The output data creation part 36 receives the internal data 161 from the output processing part 37, references the query definition information 23, creates output data 171 in accordance with the following method, and returns the created output data 171 to the output processing part 37.

FIG. 13 shows a method for creating output data 171 in a case where synchronization processing does not have to be performed, and, in addition, the lifetime 133 is specified using a time period.

In a case where the input type 164 in the internal data 161 is "input", the timestamp 162 in this internal data 161 is the extinction time of the input data 141 in the forward order. For this reason, the operation result must be output as the result of an operation in which input data does not exist.

Furthermore, in a case where the data type 164 is "extinct", the timestamp 162 in this internal data 161 is the input time of the input data 141 in the forward order. For this reason, the operation result must be output as the result of an operation in which extinct input data 141 exists.

Consequently, in both cases the output data creation part 36 creates output data 215, which comprises the previous data content (the operation result either prior to the input or prior to the extinction of the input data 141) 214 and the timestamp 212 in the latest internal data 211. In a case where the previous data content (operation result) 214 does not exist, the output data 215 is not created. Since this corresponds to a case in which the dataset 151 is not the proper state, the lack of output data 171 does not cause a problem.

In a case where the lifetime 133 is specified using a time period in the query definition information 23 in order to execute the above-mentioned processing, the output data creation part 36 stores the internal data 161 until internal data 161 comprising the next operation result has been received.

Furthermore, the reason the output data creation part 36 uses a stored previous operation result to perform an operation without the operation processing part 34 performing an operation in which either "input data does not exist" or "extinct input data exists" is that the operation processing part 34 algorithm is compatible to both forward reproduction and reverse reproduction. In accordance with this, in a case where the operation processing part 34 algorithm has changed due to the processing speed having been increased or the like, it is possible to use the post-change algorithm in both forward reproduction and reverse reproduction.

FIG. 14 shows a method for creating output data 171 in a case where synchronization processing does not have to be performed, and, in addition, the lifetime 133 is specified using the number of pieces of latest data.

In this case, of the timestamps in multiple internal data created based on the input data 141 corresponding to the number of pieces of latest data (multiple stored timestamps), the timestamp in the internal data received last (the latest internal data) denotes the oldest time. However, the latest state in the dataset 151 in the forward order is the state at the time denoted by the latest timestamp in the dataset 151. Therefore, in this case, the output data creation part 36 creates output data 224 comprising the newest (stored the furthest in the past) timestamp 225 of the stored timestamps and the latest data content (operation result) 223. Specifically, for example, in a case where there are multiple internal data timestamps, i.e. T=10, 9, 8, 7, 6, 5, created on the basis of input data 141 corresponding to the number of pieces of latest data, output data 224 comprising the data content (operation result) in the internal data of T=5 and the latest timestamp (timestamp stored the furthest in the past) T=10 is created when the internal data of T=5 (the latest internal data) is inputted.

The output processing part 37 receives the internal data 161 of the result of the operation performed by the operation processing part 34, transfers the received internal data 161 to the output determination part 35, and receives the result of the output advisability determination from the output determination part 35. Also, regardless of the output advisability, the output processing part 37 transfers the operation result internal data 161 to the output data creation part 36, and receives the output data 171 from the output data creation part 36. In a case where the result of the output advisability determination is that output is possible, the output processing part 37 outputs the output data 171 using the method described hereinbelow.

That is, the output processing part 37 outputs the output data 171 received from the output data creation part 36 as-is in a case where the output method 135 in the query definition information 23 is "data input time", "data extinction time" or "data input/extinction time".

In a case where the output data 171, for which the output method 135 is "fixed interval", and, in addition, which was received from the output data creation part 36, is the initially received output data, exclusive of a case in which the output determination part 35 has determined that output is not possible, the output processing part 37 outputs the output data 171 as-is. The time denoted by the timestamp 172 in this output data 171 is the point of origin for creating a timestamp list at the time of the next output.

In a case where the output data 171, for which the output method 135 is "fixed interval", and, in addition, which was received from the output data creation part 36, is not the initially received output data (in the case where received output data 171 is data received for the second time or more), exclusive of a case in which the output determination part 35 has determined that output is not possible, the timestamp list is created during a specified time interval from the point of origin of timestamp creation until the time denoted by the timestamp 172 in the newly received output data 171. The point of origin is not included here. In a case where a timestamp list has been created, the output processing part 37 newly creates output data 171 having the data content 173 of the received input data 171 for this timestamp, and outputs this newly created output data 171 (there may be cases in which the output data 171 is singular, multiple, or nonexistent). When the output data 171 has been outputted, the output processing part 37 replaces the point of origin for timestamp creation with the oldest of the created timestamps, and makes the time of the next output the point of origin for creating the timestamp list.

Since the above-mentioned first condition with respect to the output determination part 35 is not satisfied (that is, the condition is equivalent to "dataset is not a normal state") in a case where previous output data 171 does not exist, there is no need to output data.

Next, the specific flow of reverse reproduction in data stream processing will be explained.

Figure 11:
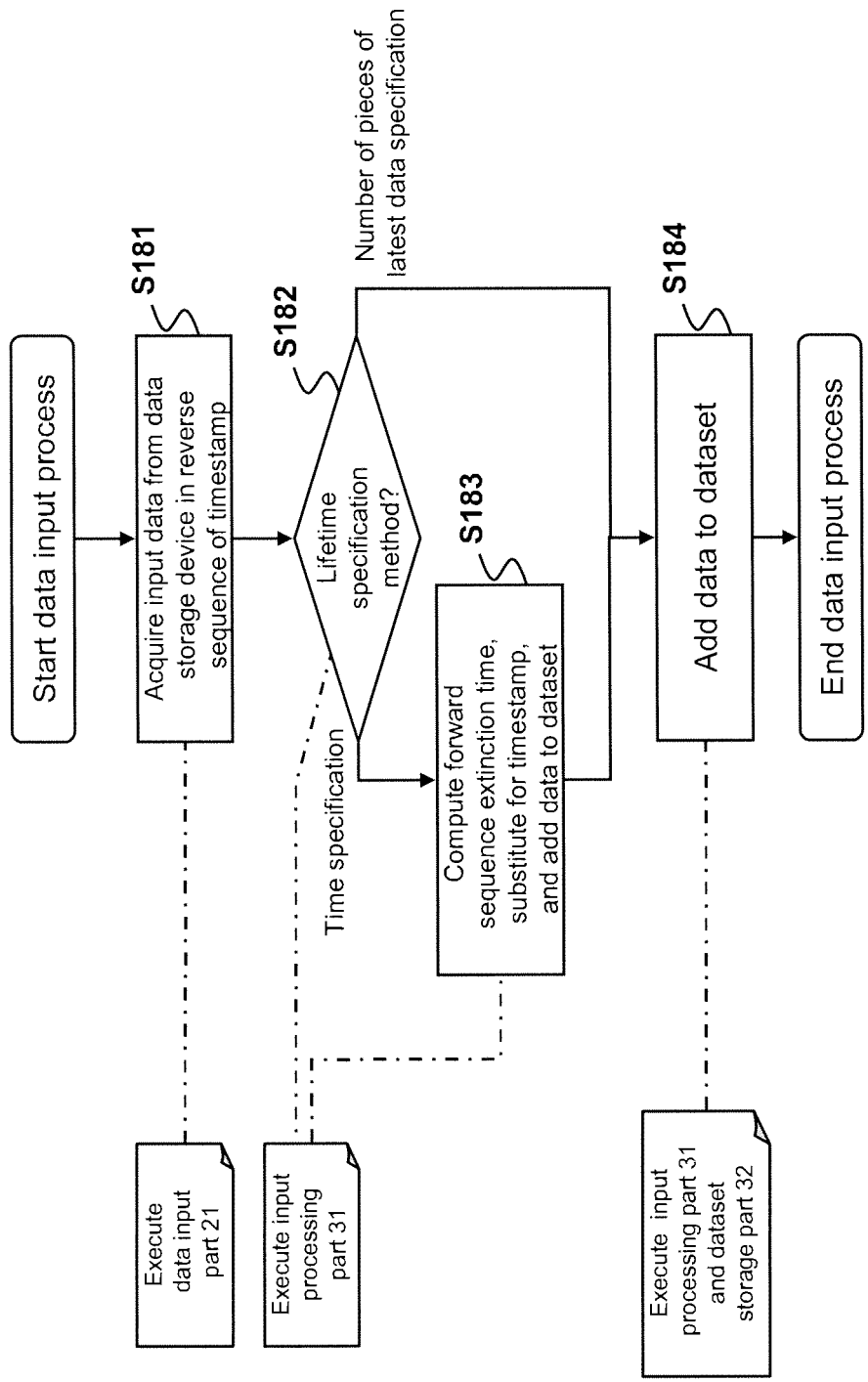
[FIG. 11]

FIG. 11 shows the flow of processing for inputting the input data 141.

First of all, in Step S181, the data input part 21, upon receiving a data input instruction from the query control part 22, acquires the input data 141 from the data storage device 4 in order from the newer-to-older times of the timestamps 123 (that is, in reverse order). The data input part 21 inputs the acquired input data to the input processing part 31. Furthermore, in this Step S181, input data 141 comprising timestamps 123 denoting times prior to the time at which the data input instruction was received are acquired in reverse order, but instead of this, input data 141 comprising timestamps 123, which denote times prior to a certain time further in the past than the time at which the data input instruction was received (for example, an event detection time), may be acquired in reverse order.

Next, in Step S182, the input processing part 31 references the query definition information 23 transferred from the query control part 22 and checks the lifetime 133 specification method. In a case where the lifetime 133 is specified using a time period, Step S183 is performed. In a case where the lifetime 133 is specified using the number of pieces of latest data, Step S184 is performed without performing Step S183.

In Step S183, the input processing part 31 computes the extinction time in the forward order by adding the time specified as the lifetime 133 to the time denoted by the timestamp 142 in the input data 141. The input processing part 31 updates the timestamp 142 of the input data 141 to the timestamp 142 denoting the computed extinction time.

In Step S184, the input processing part 31 inputs the input data 141 to the dataset storage part 32. The dataset storage part 32 adds the input data 141 to the dataset 151 comprising the same stream ID (152) as the stream ID (146) in this input data 141.

FIG. 12 shows the flows of processing for an operation and a data output. To make the explanation easier to understand, FIG. 12 shows the flow of processing in a case where an output method 135 is not specified in the query 131. The flow of processing in a case where an output method 135 is specified will be described further below.

First of all, in Step S191, in a case where either an input data 141 addition or deletion has been performed with respect to the dataset 151, the dataset storage part 32 transfers this dataset 151 to the operation processing part 34. In so doing, the dataset storage part 32 transfers to the operation processing part 34 together with the dataset 151 the data type 164 "input" in the case of the addition of input data 141, and the data type 164 "extinct" in the case of the deletion of input data 141. The operation processing part 34, upon receiving the dataset 151 and the data type 164 from the dataset storage part 32, executes an operation using the received dataset 151 and creates internal data 161 comprising the operation result.

Next, in Step S192, the operation processing part 34 configures the data type 164 received from the dataset storage part 32 in the internal data 161.

Next, in Step S193, the operation processing part 34 transfers the internal data 161 to the output processing part 37. The output processing part 37 transfers the received internal data 161 to the output determination part 35. The output determination part 35 determines the output advisability based on this internal data 161, and transfers the result of this determination to the output processing part 37. The flow of processing of the output advisability process will be described further below.

Next, in Step S194, the output processing part 37, upon receiving the result of the output advisability determination from the output determination part 35, transfers the internal data 161 to the output data creation part 36 regardless of the determination result. The output data creation part 36 references the query definition information 23 and checks the content of the operation definition 134 and the specification method of the lifetime 133. In a case where a joint process is defined in the operation definition 134, Step S201 is performed. In a case where a joint process is not needed, and, in addition, the lifetime 133 is specified using a time period, Step S195 is performed. In a case where a joint process is not needed, and, in addition, the lifetime 133 is specified using the number of pieces of latest data, Step S197 is performed.

In Step S195, the output data creation part 36 references the internal data (internal data comprising the previous operation result) 161 stored in the output data creation part 36. The output data creation part 36 creates output data 171, which comprises the timestamp 162 in the internal data 161 comprising the latest operation result, and the data content 163 in the internal data 161 comprising the previous operation result. The output data creation part 36 transfers this created output data 171 to the output processing part 37. Next, in Step S196, the output data creation part 36 deletes the internal data 161 comprising the previous operation result, and stores the internal data (internal data comprising the oldest timestamp) 161 that comprises the latest operation result in the output data creation part 36.

In Step S197, the output data creation part 36 creates output data 171, which comprises the earliest stored timestamp of the multiple timestamps stored in the output data creation part 36 (the latest timestamp of these multiple timestamps), and the data content 163 in the internal data 161 comprising the latest operation result. The output data creation part 36 transfers this created output data 171 to the output processing part 37. Next, in Step S198, the output data creation part 36 deletes the timestamp that was stored the earliest from among the multiple timestamps that are being stored, and stores the timestamp that is in the internal data comprising latest operation result in the output data creation part 36.

In Step S201, the output data creation part 36 creates output data 171, which comprises the timestamp 162 and data content 163 of the internal data 161, which is the latest operation processing result. The output data creation part transfers this created output data 171 to the output processing part 37.

Next, in Step S199, in a case where the output processing part 37 receives the output data 171 from the output data creation part 36, and, in addition, the output determination result received from the output determination part 35 denotes that output is possible, the output processing part 37 proceeds to Step S200, and in a case where the output determination result denotes that output is not possible, ends the processing. In a case where output is possible, in Step S200, the output processing part 37 outputs the output data 171. The output data 171 may be outputted to the outside of the computer system 3 via the output device 15, or may be outputted to a different program (to include a different reproduction control part 24) inside the main storage apparatus 11.

Figure 15:
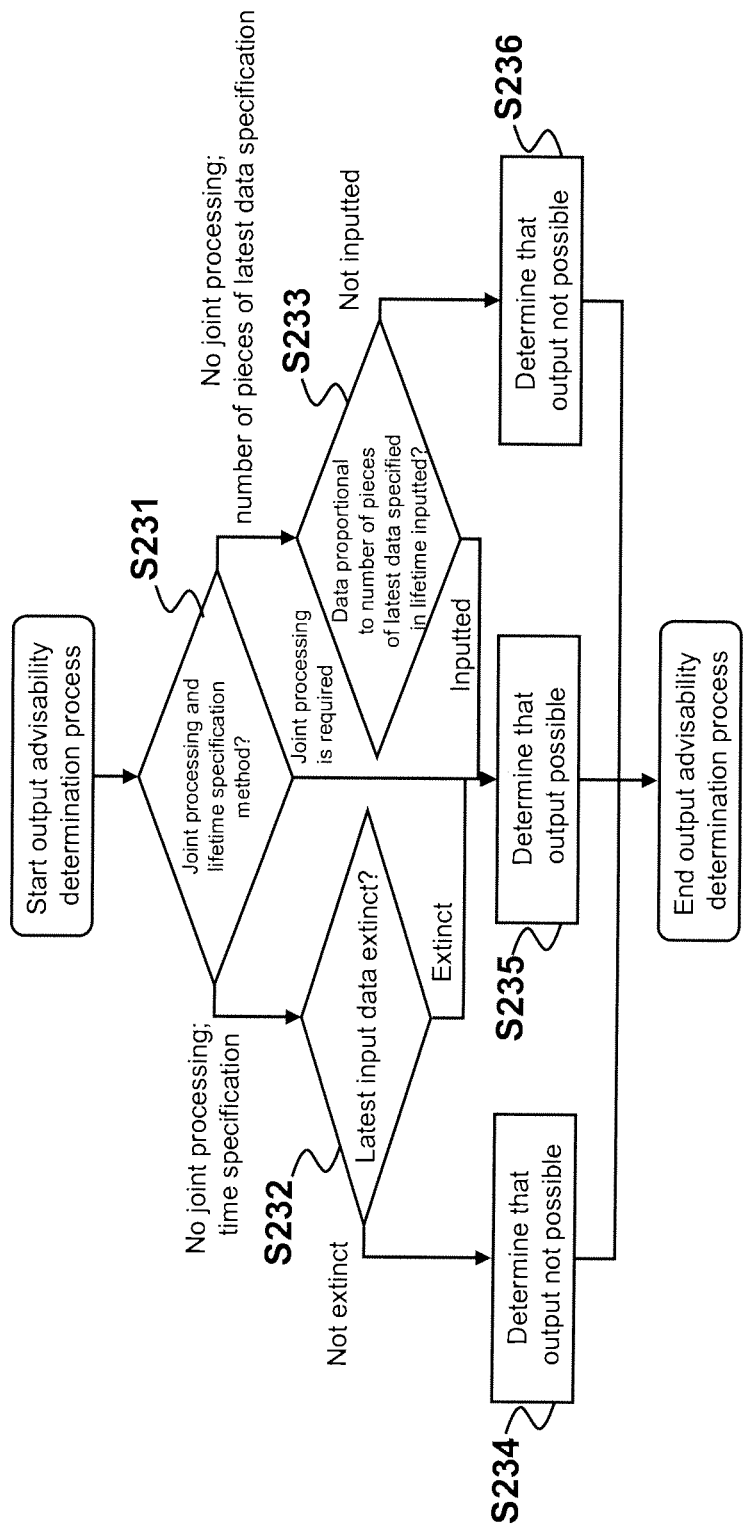
[FIG. 15]

FIG. 15 shows the flow of processing of the output advisability determination. This processing flow is the flow of processing performed in Step S193 of FIG. 12. However, it is supposed that an output method 135 has not been specified in the query 131. A case in which the output method 135 is specified will be described further below.

First of all, in Step S231, the output determination part 35 references the query definition information 23 and checks whether a joint process has been defined in the operation definition 134, and whether the lifetime 133 is specified using a time period or the number of pieces of latest data. In a case where a joint process is defined in the operation definition 134, Step S235 is performed. In Step S235, the output determination part 35 determines whether output is possible, returns this determination result to the output processing part 37, and ends the processing. In a case where a joint process is not needed, and, in addition, the lifetime 133 is specified using a time period, Step S232 is performed. In a case where a joint process is not needed, and, in addition, the lifetime 133 is specified using the number of pieces of latest data, Step S233 is performed.

In Step S232, the output determination part 35 determines whether or not the initial input data 141 has become extinct. Specifically, for example, the output determination part 35 references the data type 164 of the internal data 161 that is continuously transferred from the output processing part 37, and in a case where the data type 164 that was received first is "extinct", determines that the initial input data 141 has become extinct. In a case where the determination is that the input data 141 has become extinct, Step S235 is performed. In Step S235, the output determination part 35 determines that output is possible, returns this determination result to the output processing part 37, and ends the processing. In a case where the determination is that the input data 141 has not become extinct, Step S234 is performed. In Step S234, the output determination part 35 determines that output is not possible, returns this determination result to the output processing part 37, and ends the processing.

In Step S233, the output determination part 35 determines whether data corresponding to the number of pieces of latest data specified in the lifetime 133 has been inputted to the dataset 151. Specifically, for example, the output determination part 35 counts the number of pieces of internal data 161 comprising the data type 164 "input" among the internal data 161 that has been transferred from the output processing part 37. In a case where this count value is a value based on the number of pieces of latest data (for example, the number of pieces of latest data itself), Step S235 is performed. In Step S235, the output determination part 35 determines that output is possible, returns this determination result to the output processing part 37, and ends the processing. In a case where the above-mentioned count value is not a value based on the number of pieces of latest data, Step S236 is performed. In Step S236, the output determination part 35 determines that output is not possible, returns this determination result to the output processing part 37, and ends the processing.

Figure 16:
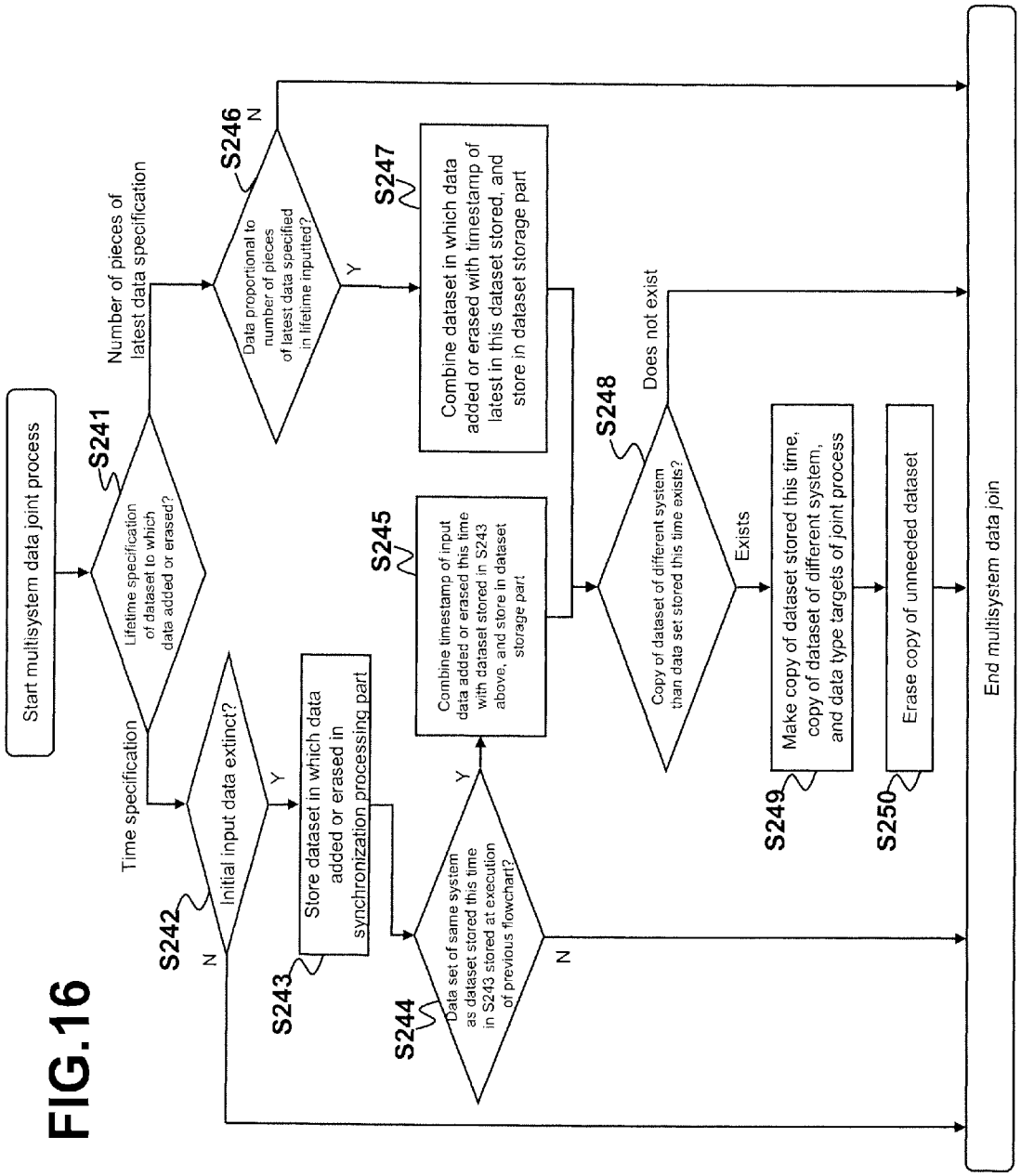
[FIG. 16]

FIG. 16 shows the flow of the synchronization of datasets 151 (joint processing for datasets 151). The operation and output process shown in FIG. 12 are performed for the joined datasets 151. The datasets 151 that are targeted for joint processing are specified in the query definition information 23 (query 131).

First of all, in Step S241, in a case where either an input data 141 addition or deletion has been performed with respect to the datasets 151 targeted for joint processing, the synchronization processing part 33 references the lifetime 133 of the query definition information 23 and checks whether the lifetime is specified using a time period or the number of pieces of latest data. In the case of a time specification, Step S242 is executed. In the case of a number of pieces of latest data specification, Step S246 is executed.

In Step S242, the synchronization processing part 33 determines whether or not the initial input data 141 has become extinct. Specifically, for example, the synchronization processing part 33 references the data type 164 that is transferred together with the dataset 151 from the dataset storage part 32, and in a case where the data type 164 received initially is "extinct", determines that the initial input data 141 has become extinct. In a case where the determination is that the input data 141 has become extinct, Step S243 is performed. In a case where the determination is that the input data 141 has not become extinct, the processing ends. In Step S243, the synchronization processing part 33 stores a copy of the dataset 151 received from the dataset storage part 32 in the synchronization processing part 33, and moves to Step S244. In S244, the synchronization processing part 33 checks whether or not a copy of a dataset of the same system as the dataset for which a copy was stored in Step S243 this time was stored when the flowchart of FIG. 16 was executed previously, and in a case where this dataset copy has been stored, proceeds to Step S245. In a case where this dataset copy has not been stored, the synchronization processing part 33 ends the processing. In S245, the synchronization processing part 33 acquires the timestamp 142 of the input data 141, which has either been added to or deleted from the dataset 151 for which a copy was stored in the S243 of this time, combines this timestamp 142 with the dataset 151 stored in the previous Step S243, and stores this combination in the dataset storage part 32. The dataset 151 stored in S243 of the previous time is deleted at this time, and the synchronization processing part 33 moves to Step S248.

In Step S246, the synchronization processing part 33 determines whether data corresponding to the number of pieces of latest data specified in the lifetime 133 has been inputted to the dataset 151. Specifically, for example, the synchronization processing part 33 counts the number of "input" data types 164 transferred together with the dataset 151 from the dataset storage part 32. In a case where this count value is a value based on the number of pieces of latest data (for example, the number of pieces of latest data itself), Step S247 is performed. In a case where the count value is not a value based on the number of pieces of latest data, processing ends. In Step S247, the synchronization processing part 33 combines the dataset 151 received from the dataset storage part 32 with the latest timestamp (showing the most future time) of the input data held by this dataset 151, and stores this combination in the dataset storage part 32. After storing this combination, the synchronization processing part 33 proceeds to Step S248.

In Step S248, the synchronization processing part 33 determines whether or not a copy of a dataset of a different system than the copied dataset exists in the dataset storage part 32. In a case where this copy exists, in Step S249, the synchronization processing part 33 transfers to the operation processing part 34 a copy of the dataset 151 for which input data 141 has been either added or deleted, the copy of the already stored different system dataset 151, and the data type 164 showing that input data 141 has been either added or deleted. However, in a case where multiple timestamps, which are combined with the copy of the data set of a different system, are further in the past than the timestamp combined with the dataset for which data was either added or deleted this time, only the newest of these past timestamps (indicating a future time) is transferred to the operation processing part 34 as the join operation target. Next, in Step S250, the synchronization processing part 33 deletes the copy of a dataset that is no longer needed (a dataset that is not a join operation target in the subsequent processing) from the dataset storage part 32. Specifically, the synchronization processing part 33 compares the timestamps combined with the copy of the dataset for which data has been either added or deleted and the copy of the dataset of a different system than this, and deletes the copy of the dataset having new data (indicating a future time) from the dataset storage part 32. In Step S248, in a case where a copy of a dataset 151 does not exist, the synchronization processing part 33 ends the processing without performing synchronization processing.

Figure 25:
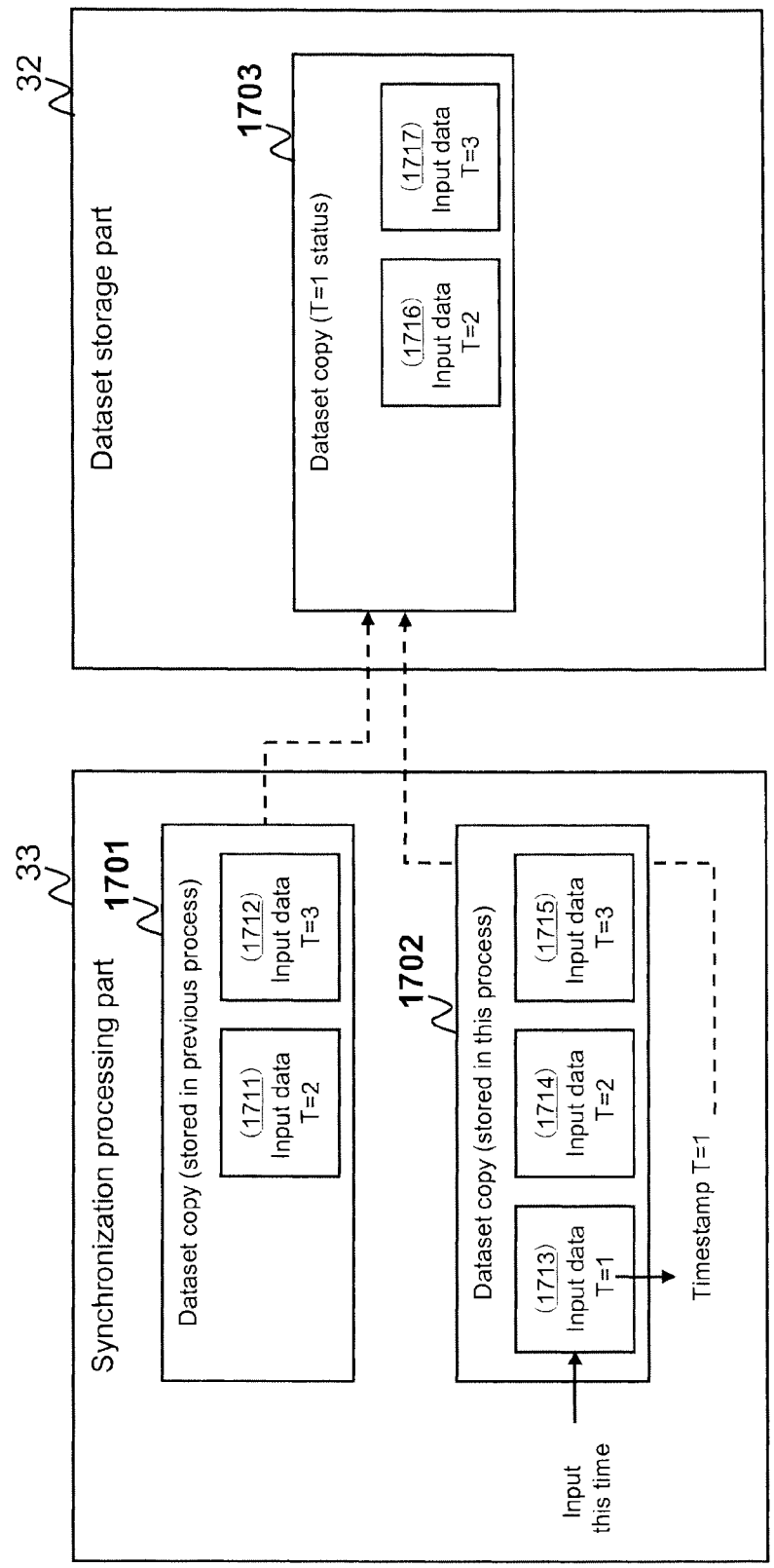
[FIG. 25]
Figure 26:
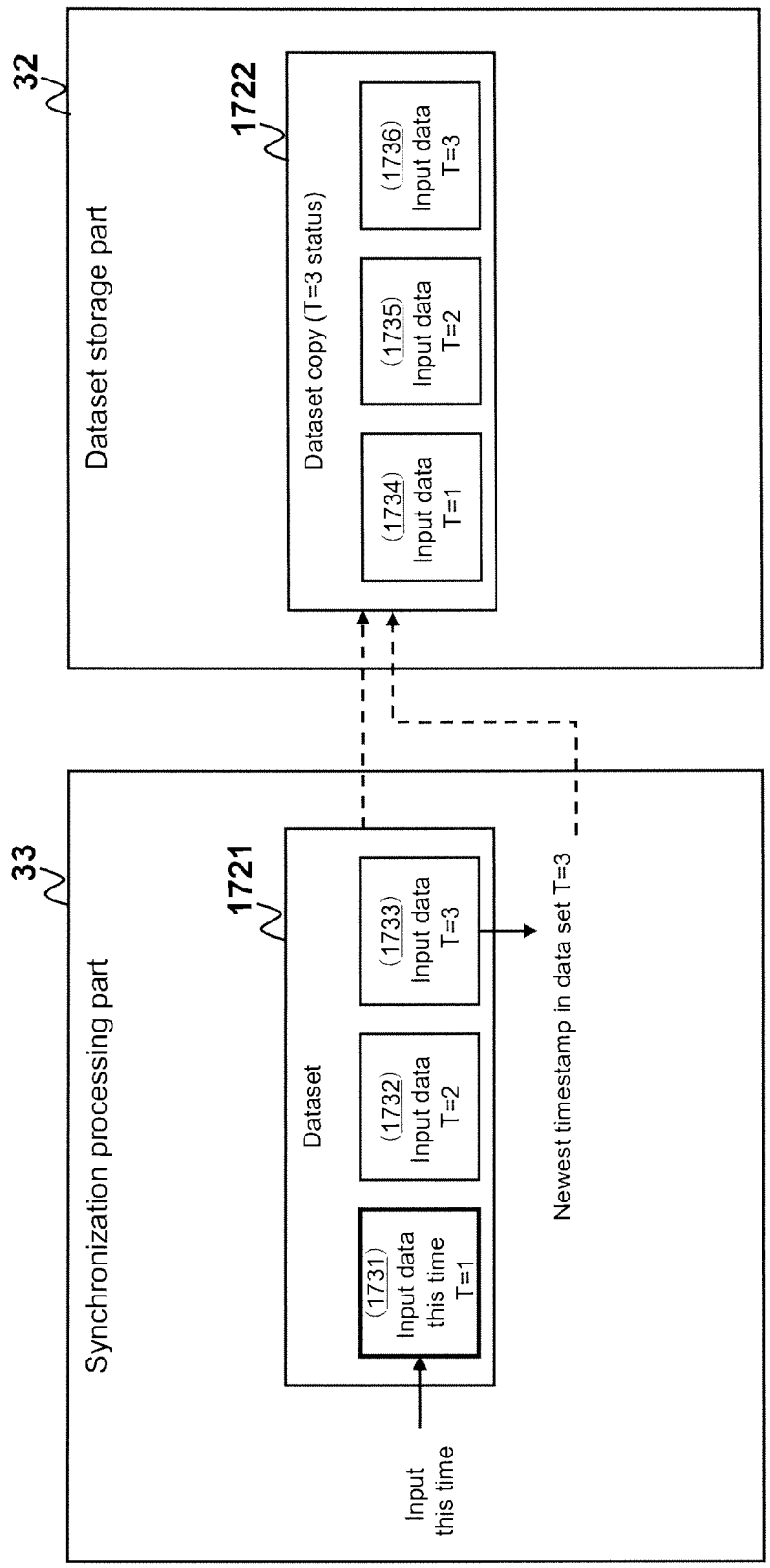
[FIG. 26]

Specific examples of processes (Steps S243 through S245, and Step S247 of FIG. 16) within a dataset 151 synchronization process up to the storage of the combination of a join operation-target dataset 151 copy and a timestamp 142 in the dataset storage part 32 is shown in FIGS. 25 and 26. FIG. 25 is a case in which the lifetime has been specified using a time period (Steps S243 through S245), and FIG. 26 is a case in which the lifetime has been specified using the number of pieces of latest data (Step S247).

In a case where the lifetime is specified using a time period, when the input data (1713) at T=1 is added to the dataset in FIG. 25, the synchronization processing part stores a copy of the dataset (1702) to which the data was added in the synchronization processing part (corresponds to Step S243 of FIG. 16). Next, the synchronization processing part 33 checks whether or not a copy of the dataset stored this time (1702) and a copy of a dataset of the same system (1701) have been stored previously (corresponds to Step S244 of FIG. 16). Since these dataset copies exist in the example of FIG. 25, the synchronization processing part 33 stores a combination (1703) of this previously stored dataset copy (1701) and the timestamp (T=1) of the data inputted this time in the dataset storage part 32 (corresponds to Step S245 of FIG. 16). After storing the combination of the dataset copy and the timestamp (1703) in the dataset storage part 32, the synchronization processing part 33 deletes the original dataset copy (1701).

In a case where the lifetime is specified using the number of pieces of latest data, when the input data (1721) at T=1 is added to the dataset in FIG. 26, the synchronization processing part receives the dataset (1721) to which the data was added from the dataset storage part 32, and searches for and acquires the latest timestamp (T=3) from the input data in this dataset (1721). After acquiring the timestamp, the synchronization processing part 33 stores a combination (1722) of this timestamp (T=3) and the dataset (1721) in the dataset storage part 32 (the preceding corresponds to Step S247 of FIG. 16).

Figure 17:
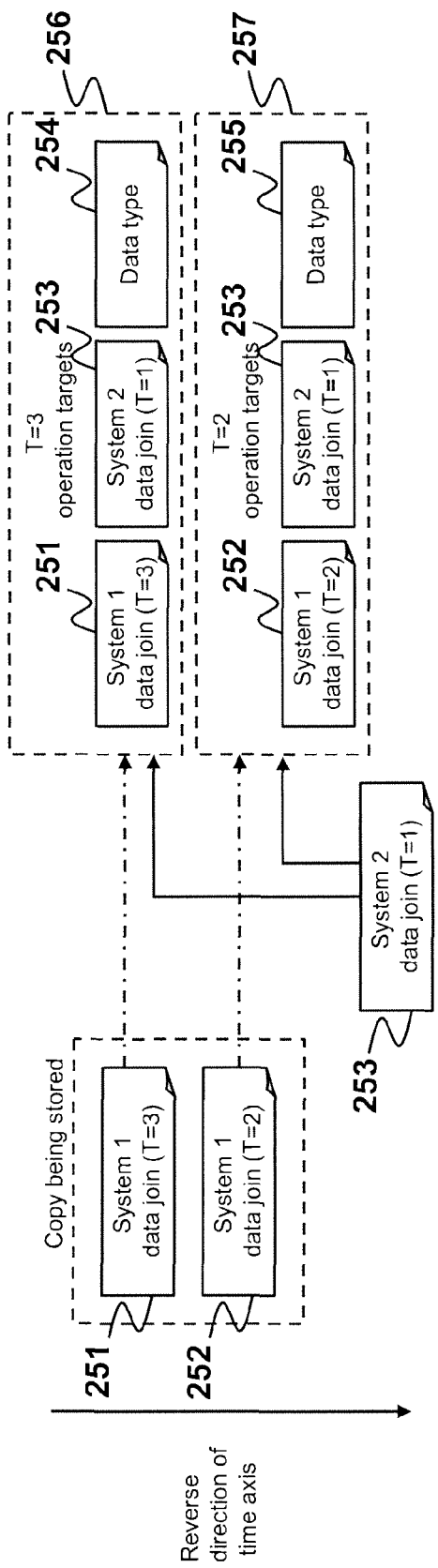
[FIG. 17]

FIG. 17 shows specific examples of processes (Step S248 through Step S250 of FIG. 16) within a dataset 151 synchronization process in which synchronization is actually performed after a combination of a timestamp 142 and a copy of a dataset 151 targeted for a join operation have been stored in a dataset storage part 32.

The synchronization processing part 33, after storing a combination (251) of a copy of a system 1 dataset and a timestamp (T=3) in the dataset storage part 32 in either Step S245 or S247 of FIG. 16, checks whether a copy of a dataset of another system exists (corresponds to Step S248 of FIG. 16). Since a copy of a dataset of another system does not exist at this point in time, the synchronization processing part 33 does not transfer an operation target to the operation processing part 34.

The synchronization processing part 33, after storing a combination (252) of a copy of a system 1 dataset and a timestamp (T=2) in the dataset storage part 32 in either Step S245 or S247 of FIG. 16, checks whether a copy of a dataset of another system exists (corresponds to Step S248 of FIG. 16). Since a copy of a dataset of another system does not exist at this point in time, the synchronization processing part 33 does not transfer an operation target to the operation processing part 34.

The synchronization processing part 33 stores a combination (253) of a copy of a system 2 dataset and a timestamp (T=1) in the dataset storage part 32 in either Step S245 or S247 of FIG. 16.

After storing this combination, the synchronization processing part 33 acquires the respective copies of the system 1 dataset (the respective copies that are stored) (251, 252). Then, the synchronization processing part 33 creates operation targets (256) and (257), and transfers these targets to the operation processing part 34 (corresponds to Step S248 and Step S249 of FIG. 16). The operation target (256) includes the system 2 dataset (253), the copy of the system 1 dataset (251), and the timestamp (254) indicating that input data 141 has been either added to or deleted from the system 2 dataset (253). The operation target (257) includes the system 2 dataset (253), the copy of the system 1 dataset (252), and the timestamp (255) indicating that input data 141 has been either added to or deleted from the system 2 dataset (253). The synchronization processing part 33, after performing a joint process for the system 1 datasets (251, 252) with respect to the system 2 dataset (253), deletes the copies (251, 252) of the system 1 datasets for which the combined timestamps show future times (corresponds to Step S250 of FIG. 16).

Figure 18:
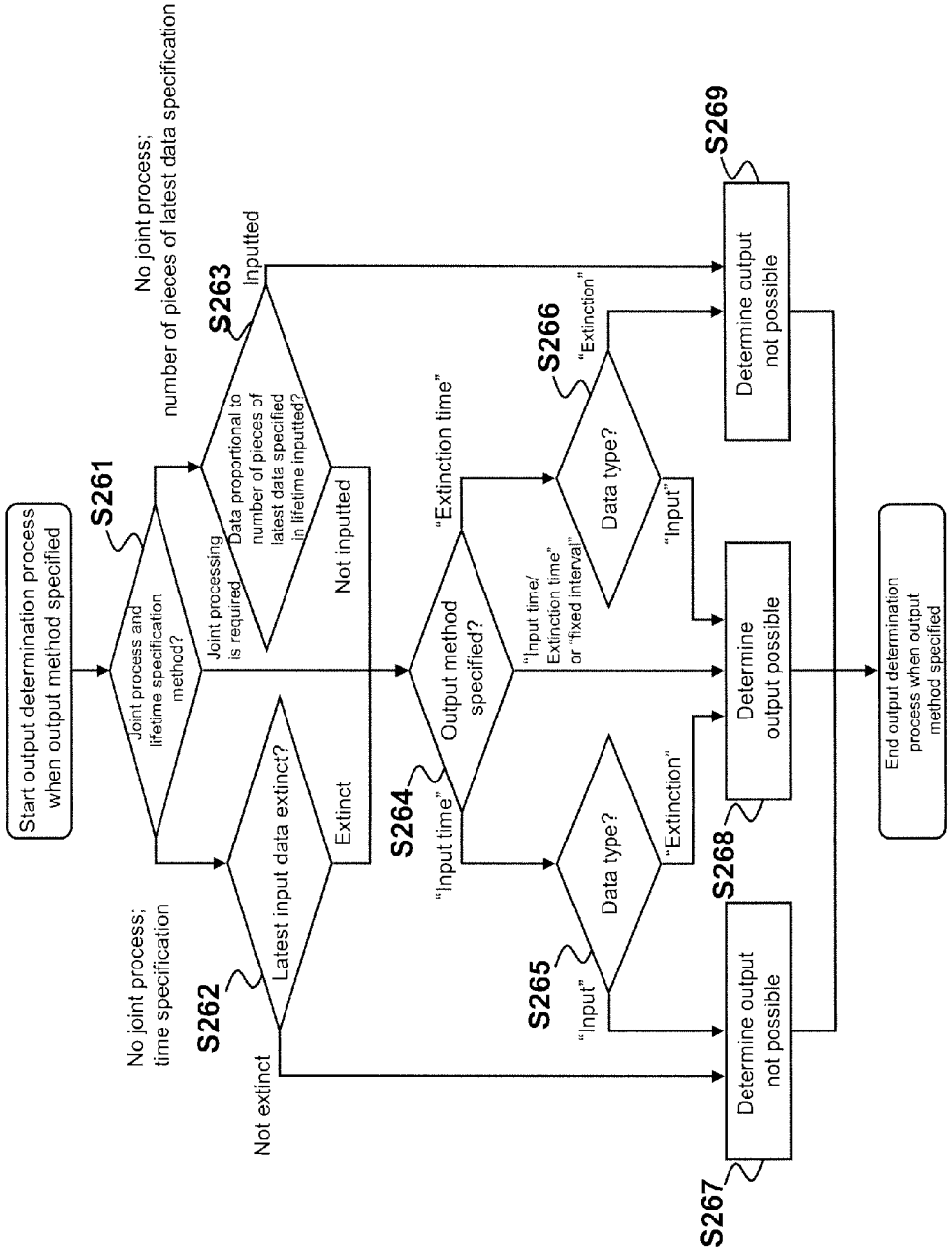
[FIG. 18]

FIG. 18 shows the flow of processing of the output advisability determination in a case where an output method 135 specification exists in the query 131.

First of all, in Step S261, in a case where the internal data 161 has been transferred from the output processing part 37, the output determination part 35 references the query definition information 23 and determines whether the lifetime 133 is specified using the number of pieces of latest data. In a case where the lifetime 133 is specified using a time period, Step S262 is performed, and in a case where the lifetime 133 is specified using the number of pieces of latest data, Step S263 is performed.

In Step S262, the output determination part 35 determines whether or not the initial input data has become extinct. The determination method is the same as that of Step S232 of FIG. 15. In a case where the determination is that the input data has become extinct, Step S264 is performed. In a case where the determination is that the input data has not become extinct, Step S267 is performed. In Step S267, the output determination part 35 determines that output is not possible, returns this determination result to the output processing part 37, and ends the processing.

In Step S263, the output determination part 35 determines whether input data corresponding to the number of pieces of latest data specified as the lifetime 133 has been inputted to the dataset. The determination method is the same as Step S233 in FIG. 15. In a case where the determination is that input data corresponding to the number of pieces of latest data has been inputted, Step S264 is performed. When the determination is made that input data is not inputted by the number corresponding to the number of the latest data, Step S269 is executed. In Step S269, the output determination part 35 determines that output is not possible, returns this determination result to the output processing part 37, and ends the processing.

In Step S264, the output determination part 35 references the query definition information 23, and checks the output method 135 specification. In a case where "input time" is specified as the output method 135, Step S265 is performed. In a case where "extinction time" is specified as the output method 135, Step S266 is performed. In a case where either "input time/extinction time" or "fixed interval" is specified as the output method 135, Step S268 is performed. In Step S268, the output determination part 35 determines that output is possible, returns this determination result to the output processing part 37, and ends the processing.

In Step S265, the output determination part 35 references the data type 164 of the internal data 161 that was transferred from the output processing part 37. In a case where the data type 164 is "input", Step S267 is performed. In Step S267, the output determination part 35 determines that output is not possible, returns this determination result to the output processing part 37, and ends the processing. In a case where the data type 164 is "extinct", Step S268 is performed. In Step S268, the output determination part 35 determines that output is possible, returns this determination result to the output processing part 37, and ends the processing.

In Step S266, the output determination part 35 references the data type 164 of the internal data 161 that was transferred from the output processing part 37. In a case where the data type 164 is "extinct", Step S269 is performed. In Step S269, the output determination part 35 determines that output is not possible, returns this determination result to the output processing part 37, and ends the processing. In a case where the data type 164 is "input", Step S268 is performed. The output determination part 35 determines that output is possible, returns this determination result to the output processing part 37, and ends the processing.

Figure 19:
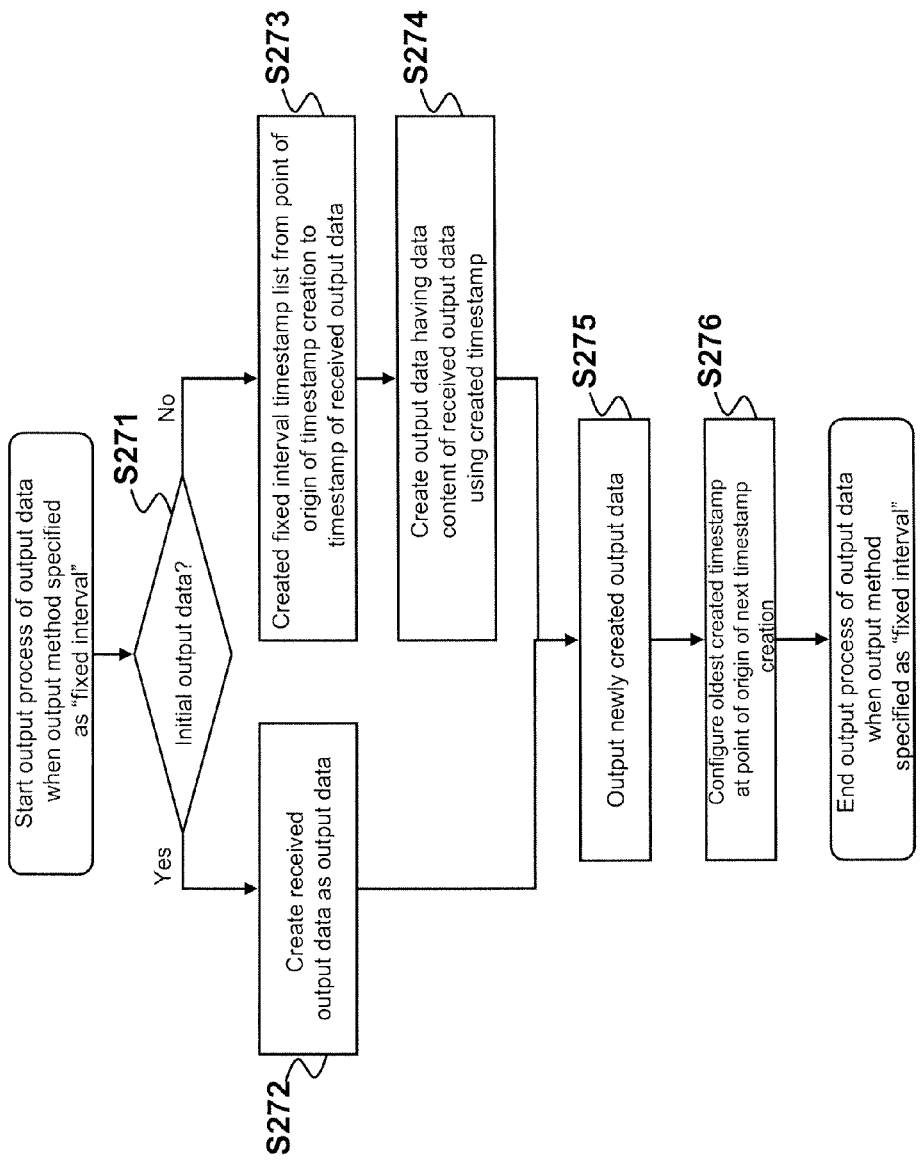
[FIG. 19]

FIG. 19 shows the flow of output processing in a case where "fixed interval" is specified as the output method 135. Furthermore, in a case where the output method 135 is "input time", "extinction time" or "input time/extinction time", output data 171 is outputted as-is the same as in a case where the output method 135 has not been specified.

First of all, in Step S271, the output processing part 37 determines whether or not the output data 171 transferred from the output data creation part 36 is the output data that was created initially. The "initially created output data" is output data corresponding to internal data that was created initially based on the target dataset. Specifically, for example, the output processing part 37 sets a flag when the output data 171 is initially received, and stores this flag in the output processing part 37. The determination as to whether or not the transferred output data is the output data that was initially created is made in accordance with whether or not the flag is set. However, in a case where the output determination part 35 has determined that output is not possible, the output processing part 37 does not set the flag. In the case of initial output data, Step S272 is performed, and in a case where the transferred output data is not the initial output data, Step S273 is performed.

In Step S272, the output processing part 37 regards the received output data 171 as the output data and moves to Step S275.

In Step S273, the output processing part 37 creates a timestamp list in accordance with the time interval specified by the output method 135 from the point of origin of timestamp creation (point of origin configured in Step S276 of the output process performed immediately prior) until the time denoted by the timestamp in the received output data 171. The point of origin is not included here.

Next, in Step S274, the output processing part 37 newly creates output data, which comprises a timestamp included in the timestamp list created in Step S273, and the data content 173 in the output data 171 received from the output data creation part 36.

Next, in Step S275, the output processing part 37 outputs to the outside of the reproduction control part 24 the new output data that was created. The outputted output data, as described hereinabove, can be outputted to the outside of the computer system 3 or to another program (to include another reproduction control part 24) inside the main storage apparatus 11.

Next, in Step S276, the output processing part 37 configures as the point of origin for new timestamp creation the time denoted by the oldest (past) timestamp among the timestamps of the newly created output data.

FIG. 20 shows specific examples of Step S273 and Step S274 of FIG. 19. It is supposed that "fixed interval" is specified as the output method 135, and that a time interval of 3 is configured in the query 131.

When the output data (initial output data) 281 comprising a timestamp T=10 has been transferred, the output processing part 37 outputs this initial output data 281, and configures the point of origin for the creation of a second timestamp in the T=10.

In a case where output data (the second output data) 282 comprising a timestamp T=5 has been transferred, the output processing part 37 creates as a timestamp list the timestamp (T=7), exclusive of the point of origin, between the point of origin (T=10) and the timestamp (T=5) of the second output data 282 in conformance to the time interval of 3. The T=7 is a value obtained by subtracting the time interval of 3 from the point of origin T=10. The output processing part 37 creates and outputs new output data 292, which comprises the timestamp (T=7) in this timestamp list, and the data content of the second output data 282. When the output data 292 has been outputted, the output processing part 37 configures the point of origin for the creation of the subsequent (third) timestamp in the oldest T=7 within the new output data.

In a case where output data (third output data) 283 comprising a timestamp T=0 has been transferred, the output processing part 37 creates as a timestamp list the timestamps (T=4, T=1), exclusive of the point of origin, between the point of origin (T=7) and the timestamp T=0 of the third output data 283 in conformance to the time interval of 3. The T=4 is a value obtained by subtracting the time interval of 3 from the point of origin T=7, and the T=1 is a value obtained by subtracting the time interval of 3 from the obtained T=4. The output processing part 37 creates and outputs new output data (293, 294), which comprises the timestamps (T=4, T=1) in this timestamp list, and the data content of the third output data 283. When the output data (293, 294) has been outputted, the output processing part 37 configures the point of origin for the creation of the subsequent (fourth) timestamp in the oldest T=1 within the new output data.

FIG. 21 shows the flow of a query linkage process.

The "query linkage process" is such that output data conforming to a first query is regarded as input data at reproduction conforming to a second query, and output data is outputted on the basis of this input data. In accordance with this, multiple reproduction control parts (301, 302) are used.

The data input part 21 inputs input data 311 to a first reproduction control part 301. The first reproduction control part 301 inputs output data 312 outputted as a result of reproduction (for example, a reverse reproduction) to a second reproduction control part 302. Output data 313 outputted by the second reproduction control part 302 as the result of the reproduction (for example, a reverse reproduction) is the ultimate output data outputted as a result of the reproduction (for example, a reverse reproduction) in the data stream processing.

According to the embodiment described above, a reverse reproduction is performed during the data stream processing. For this reason, the input data is processed in reverse order from the input data comprising the latest timestamp of the timestamps denoting times prior to the reference time (for example, the time at which the data input part 21 received the data input instruction). In accordance with this, the time required for detecting an event-related phenomenon can be shortened.

Also, when reverse reproduction becomes possible in data stream processing, real-time analysis based on future input data with respect to the reference time (for example, the current time) can be performed while performing analysis based on past input data with respect to the reference time, making it possible to perform input data analysis more efficiently. Specifically, for example, the data input part 21 chronologically acquires input data from the data storage device 4 beginning with the input data comprising the timestamp, which denotes the oldest time from among the input data 141 comprising timestamps denoting times subsequent to the reference time, in parallel with acquiring input data in reverse chronological order from the data storage device 4 beginning with the input data 141 comprising the timestamp, which denotes the latest time from among the input data 141 comprising timestamps denoting times prior to the reference time (for example, the event detection time), and inputs this input data to the reproduction control part 24 (input processing part 31). The reproduction control part 24 performs forward reproduction using input data inputted in chronological order in parallel with the reverse reproduction using the input data inputted in reverse chronological order. The reproduction control part 24 (output control part 37) can display the reverse reproduction result and the forward reproduction result on separate screens (for example, graphs) or on the same screen (for example, graph).

Figure 24:
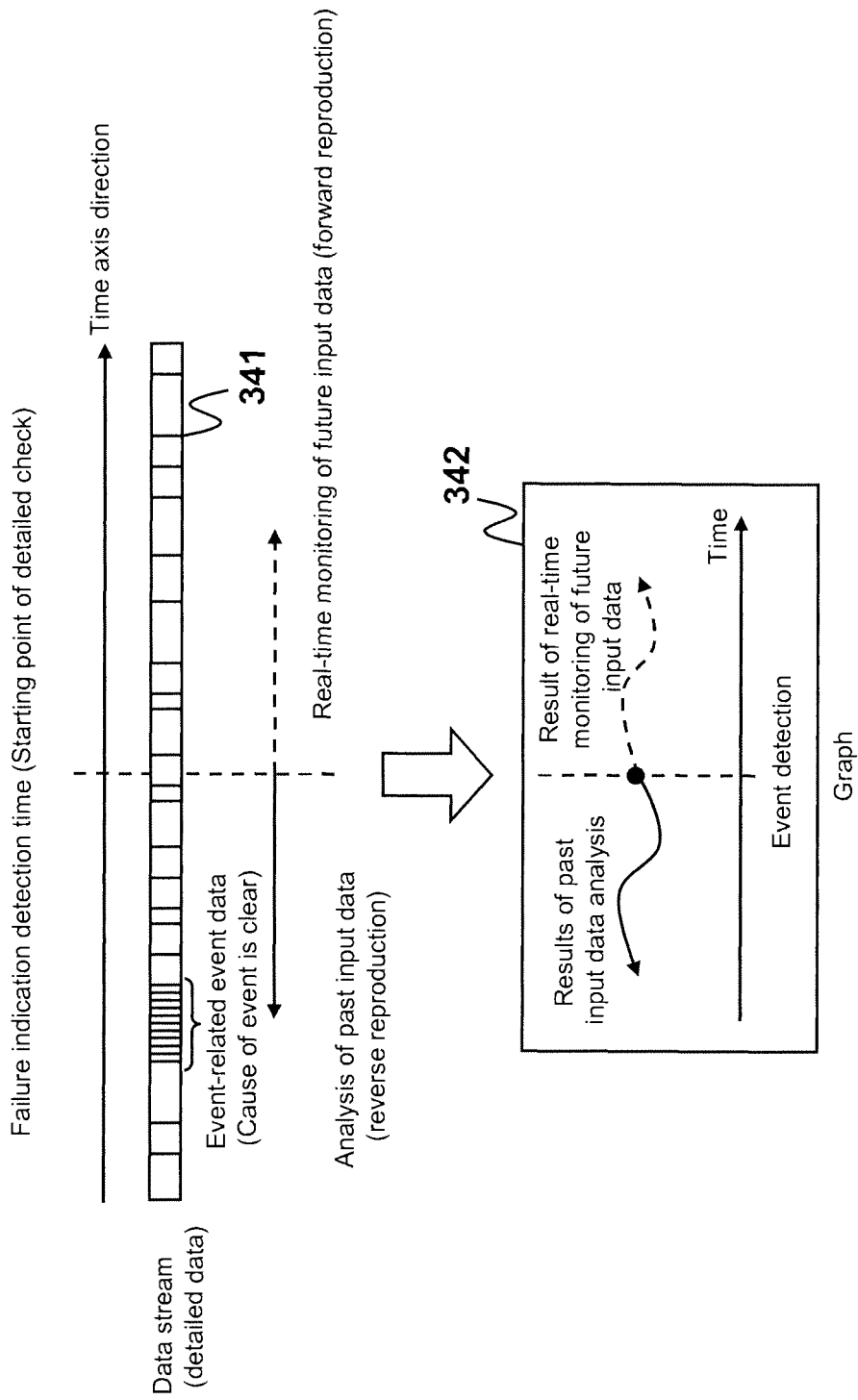
[FIG. 24]

FIG. 24 shows the effects in accordance with parallelly performing the analysis of past input data and the real-time monitoring of future input data within the input data stream 341. A graph 342, which denotes the results of reproduction (the results of reproductions in both the past and future directions, that is, the results of a reverse reproduction and a forward reproduction) that used the detection time of an event (for example, failure symptom) as a reference, is created and outputted by the output processing part 37. This can make it easier for a user, who is monitoring the data stream 341, to detect an event-related phenomenon (for example, the cause of the event). Furthermore, in the graph 32, the horizontal axis denotes the time, and the vertical axis denotes the operation result (values included in the data content inside the output data).

The preferred embodiment of the present invention has been explained hereinabove, but this embodiment is an example for illustrating the present invention, and does not purport to limit the scope of the present invention to this embodiment.

The present invention can be put into practice in a variety of other modes.

REFERENCE SIGNS LIST

1 Data stream source
3 Computer system
4 Data storage device
5 Query storage device
21 Data input part
22 Query control part
23 Query definition information
24 Reproduction control part
31 Input processing part
32 Dataset storage part
33 Synchronization processing part
34 Operation processing part
35 Output determination part
36 Output data creation part
37 Output processing part

The invention claimed is:

1. A data processing system comprising one or more processors, the data processing system comprising:
   a definition information storage part for storing definition information, which includes information denoting a lifetime of input data in a data stream, which is a stream of input data including a time-denoting timestamp and an operation target value, and an operation method;
   wherein the one or more processors are configured with:
   a reproduction control part configured to perform a reproduction, which is the outputting of output data including a result of an operation that uses an operation-target value(s) within either one or multiple input data; and
   a data input part configured to acquire from the data stream, in reverse chronological order, input data, with this acquisition being performed beginning with input data including a timestamp denoting a latest time from among input data including a timestamp denoting times prior to a certain reference time, and to input the acquired input data to the reproduction control part,
   wherein the reproduction control part is configured to perform the following processing:
   (a) adding inputted input data to a dataset of input data;
   (b) performing an operation by an operation method denoted by the definition information using an operation-target value(s) in the one or multiple input data in the dataset;
   (c) determining whether or not outputting is possible based on the lifetime denoted by the definition information;
   (d) creating output data including a timestamp, which is based on a timestamp(s) within the one or multiple input data and the lifetime, and the operation result; and
   (e) outputting, in a case where the result in the (c) is affirmative, the output data created in the (d), wherein:
   the lifetime is specified in accordance with either a time period, or the number of pieces of latest data, which is the maximum number of pieces of input data capable of being put in a dataset, and
   the reproduction control part includes an input processing part, a dataset storage part, an operation processing part, an output processing part, an output determination part, and an output data creation part, and wherein in the (a), the input processing part is configured to input input data inputted from the data input part to the dataset storage part, and the dataset storage part adds the inputted input data to the dataset;

in the (b), the operation processing part is configured to create internal data, which includes a timestamp(s) in either one or multiple input data in the data set, and the result of an operation that uses an operation-target value(s) within this one or multiple input data;

in the (c), the output determination part is configured to determine whether or not output is possible;

in the (d), the output data creation part is configured to create the output data; and in the (e), in a case where the result in the (c) is affirmative, the output processing part is configured to output the output data created in the (d), the output data creation part stores the internal data created in the (b), and (A) in a case where the lifetime is specified in accordance with a time period:

in the (a), the input processing part is configured to correct a time, which is denoted by a timestamp in the inputted input data, to an extinction time in the forward order, which is a time computed by adding this time to the lifetime, and the dataset storage part is configured to add input data including the post-correction timestamp to a dataset;

in the (c), the output determination part is configured to determine that output is possible when input data initially added to the dataset having become extinct;

in the (d), the output data creation part is configured to create output data, which includes a timestamp in the latest internal data, and an operation result in the immediately preceding internal data, and (B) in a case where the lifetime is specified in accordance with the number of pieces of latest data:

in the (c), the output determination part is configured to determine that output is possible when input data corresponding to the number of pieces of latest data in the dataset have been inputted; and in the (d), the output data creation part is configured to create output data including the timestamp stored earliest from among the stored timestamps, and the operation result in the latest internal data.

2. A data processing system according to claim 1, wherein the internal data has information denoting a data type, and in a case where the dataset, which includes the either one or multiple pieces of input data constituting the basis of the internal data, is the dataset at the time when input data has been added, the data type is a first type called "input", and in a case where this dataset is the dataset at the time when input data becomes extinct, the data type is a second type called "extinct", the definition information includes information denoting an output method, the output method is a method of "input time", which is a method for outputting an operation result at the time when input data has been added to a dataset, or a method of "extinction time", which is a method for outputting an operation result at the time when input data disappears from a dataset, the output determination part is configured to, either in a case where the lifetime is specified in accordance with a time period, and, in addition, the input data initially added to the dataset have become extinct, or in a case where the lifetime is specified in accordance with the number of pieces of latest data, and, in addition, input data corresponding to the number of pieces of latest data have been inputted to the dataset, (X) in a case where the output method is "input time":

(x1) determine that output is not possible in a case where the data type denoted by the information included in the internal data is "input"; and (x2) determine that output is possible in a case where the data type denoted by the information included in the internal data is "extinct", and (Y) in a case where the output method is "extinction time":

(y1) determine that output is not possible in a case where the data type denoted by the information included in the internal data is "extinct"; and (y2) determine that output is possible in a case where the data type denoted by the information included in the internal data is "input".

3. A data processing system according to claim 2, wherein the output method is a method of "input time/extinction time", which is a method for outputting an operation result either when input data has been added to a dataset, or when input data has disappeared from a dataset, or a method of "fixed interval", which is a method for outputting an operation result at fixed time intervals, and the output determination part is configured to determine that output is possible regardless of the data type denoted by information in the internal data either in a case where the lifetime is specified in accordance with a time period, and, in addition, the input data initially added to the dataset have become extinct, or in a case where the lifetime is specified in accordance with the number of pieces of latest data, and, in addition, input data corresponding to the number of pieces of latest data have been inputted to the dataset, when the output method is either a method of "input time/extinction time" or "fixed interval".

4. A data processing system according to claim 3, wherein, in a case where the output method is a method of "fixed interval", the output processing part is configured to perform the following processing in the (e):

(e1) determining whether or not output data created by the output data creation part is initially created data;

(e2) in a case where the result of the determination in the (e1) is affirmative, (e2-1) outputting this initially created output data, and (e2-2) setting the time denoted by the timestamp in this output data as a point of origin; and (e3) in a case where the result of the determination in the (e2) is affirmative, (e3-1) creating, in conformance to a prescribed time interval, a timestamp denoting a time, exclusive of the point of origin, between the point of origin and the time denoted by the timestamp in the created output data, (e3-2) creating and outputting new output data including this timestamp and the operation result in the created output data for each created timestamp, and (e3-3) setting the time denoted by the timestamp in the output data outputted lastly in the (e3-3) as the point of origin.

* * * * *